United States Patent
Inoue et al.

(10) Patent No.: US 9,929,408 B2
(45) Date of Patent: Mar. 27, 2018

(54) ELECTRODE MEMBER, SECONDARY BATTERY, AND METHOD FOR MANUFACTURING ELECTRODE MEMBER

(71) Applicant: SEMICONDUCTOR ENERGY LABORATORY CO., LTD., Atsugi-shi, Kanagawa-ken (JP)

(72) Inventors: Nobuhiro Inoue, Kanagawa (JP); Ryota Tajima, Kanagawa (JP); Naoki Kurihara, Kanagawa (JP); Junpei Momo, Kanagawa (JP)

(73) Assignee: Semiconductor Energy Laboratory Co., Ltd., Kanagawa-ken (JP)

( * ) Notice: Subject to any disclaimer, the term of this patent is extended or adjusted under 35 U.S.C. 154(b) by 277 days.

(21) Appl. No.: 14/528,579

(22) Filed: Oct. 30, 2014

(65) Prior Publication Data
US 2015/0132648 A1    May 14, 2015

(30) Foreign Application Priority Data
Nov. 8, 2013  (JP) .................................. 2013-232118

(51) Int. Cl.
*H01M 4/80* (2006.01)
*H01M 4/04* (2006.01)
*H01M 4/1395* (2010.01)
*H01M 4/38* (2006.01)
(Continued)

(52) U.S. Cl.
CPC ........... *H01M 4/80* (2013.01); *H01M 4/0404* (2013.01); *H01M 4/134* (2013.01); *H01M 4/1395* (2013.01); *H01M 4/38* (2013.01); *H01M 4/387* (2013.01); *H01M 4/661* (2013.01); *H01M 4/668* (2013.01); *H01M 2220/30* (2013.01)

(58) Field of Classification Search
CPC ........ H01M 4/134; H01M 4/80; H01M 4/387; H01M 4/38; H01M 4/661; H01M 4/0404; H01M 4/1395; H01M 4/668; H01M 2220/30
See application file for complete search history.

(56) References Cited

U.S. PATENT DOCUMENTS

| 8,835,048 B2 | 9/2014 | Kuriki et al. | |
| 2008/0096110 A1* | 4/2008 | Bito | H01M 4/131 429/220 |
| 2011/0305950 A1 | 12/2011 | Kuriki et al. | |

(Continued)

FOREIGN PATENT DOCUMENTS

| JP | 09-245799 A | 9/1997 |
| JP | 2001-250543 A | 9/2001 |

(Continued)

*Primary Examiner* — Muhammad S Siddiquee
(74) *Attorney, Agent, or Firm* — Nixon Peabody LLP; Jeffrey L. Costellia

(57) ABSTRACT

To inhibit degradation of charge and discharge cycle characteristics of a secondary battery. To suppress generation of defects due to expansion and contraction of an active material in a negative electrode. To inhibit deterioration of an electrode due to changes in its form. An electrode member including a current collector, an active material, and a porous body is used. The porous body is in contact with one surface of the current collector and includes a plurality of spaces. The active material is located in the space in the porous body. The space has a larger size than the active material.

24 Claims, 21 Drawing Sheets

(51) Int. Cl.
*H01M 4/66* (2006.01)
*H01M 4/134* (2010.01)

(56) References Cited

U.S. PATENT DOCUMENTS

| | | | |
|---|---|---|---|
| 2013/0052522 A1 | 2/2013 | Inoue et al. | |
| 2013/0271085 A1* | 10/2013 | Chen | H01G 11/50 320/132 |
| 2014/0127566 A1 | 5/2014 | Kuriki et al. | |
| 2015/0311516 A1* | 10/2015 | Chen | H01M 4/485 429/220 |

FOREIGN PATENT DOCUMENTS

| | | |
|---|---|---|
| JP | 2012-018909 A | 1/2012 |
| JP | 2012-018919 A | 1/2012 |

* cited by examiner

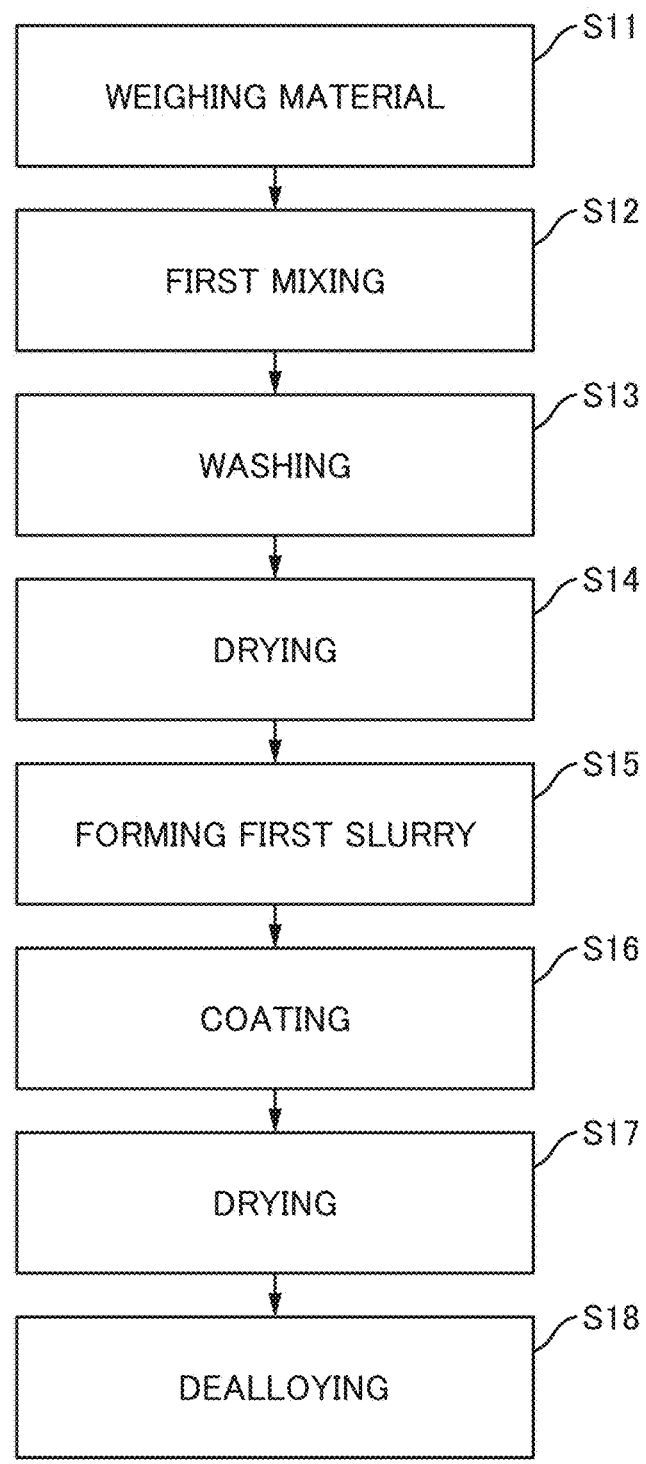

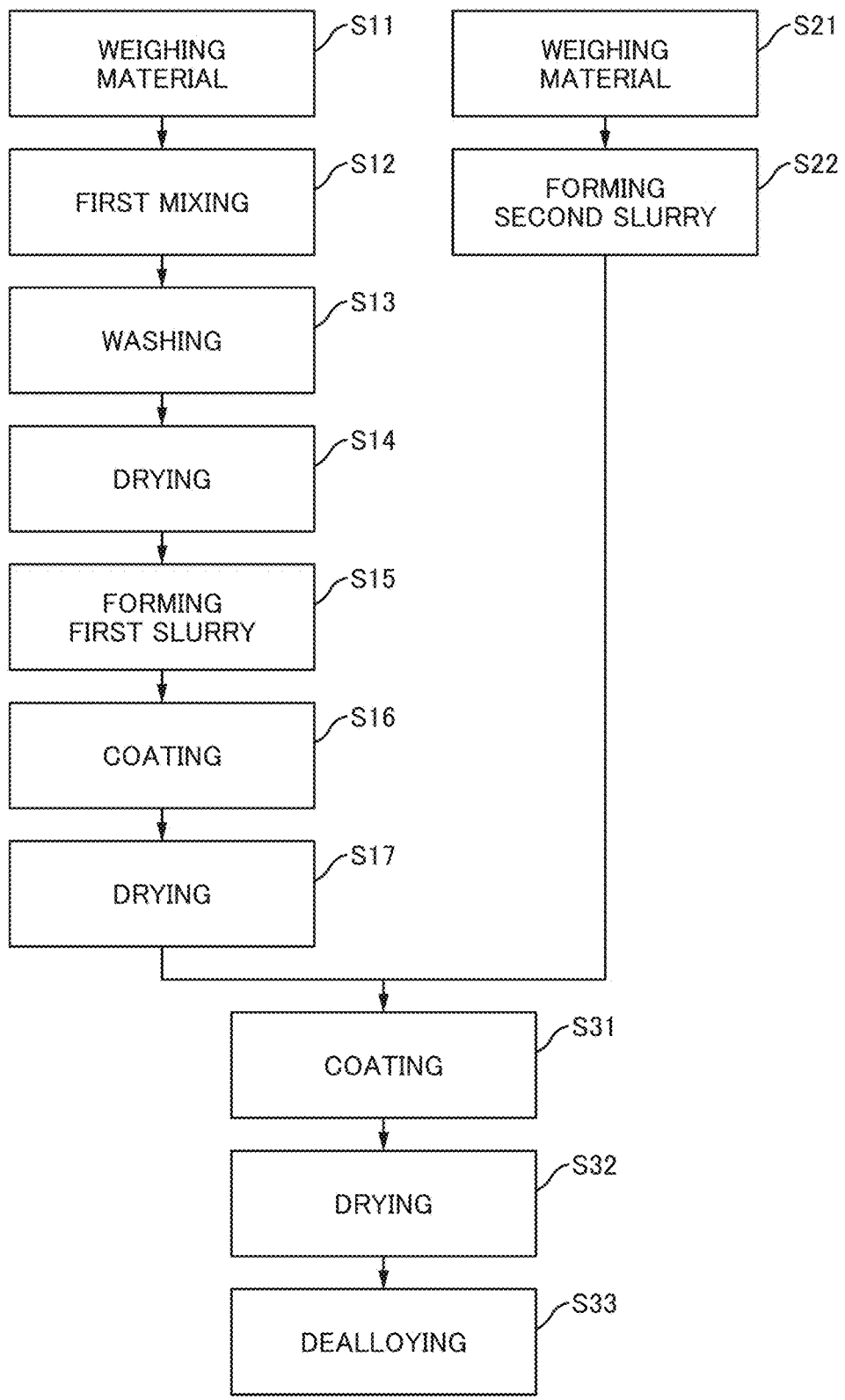

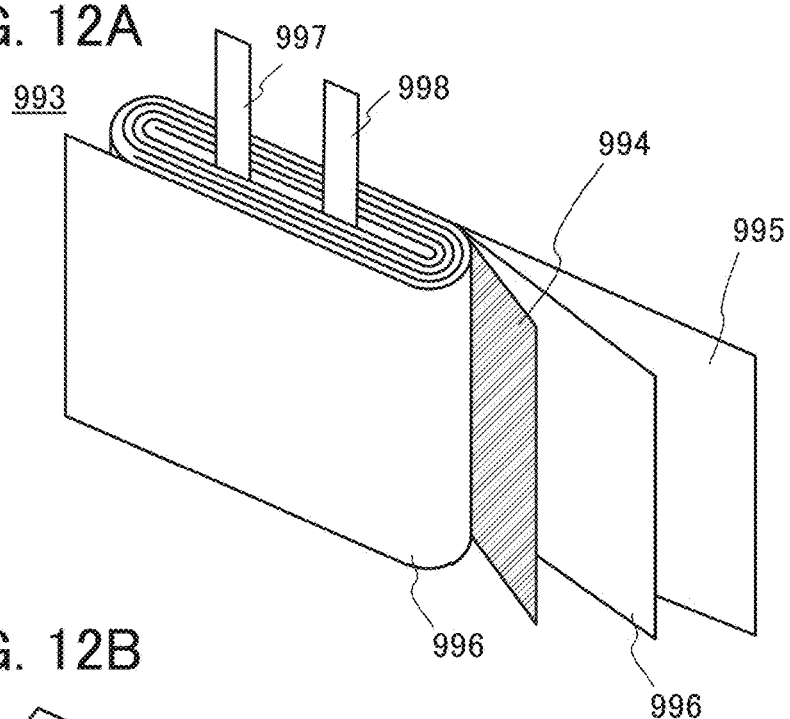
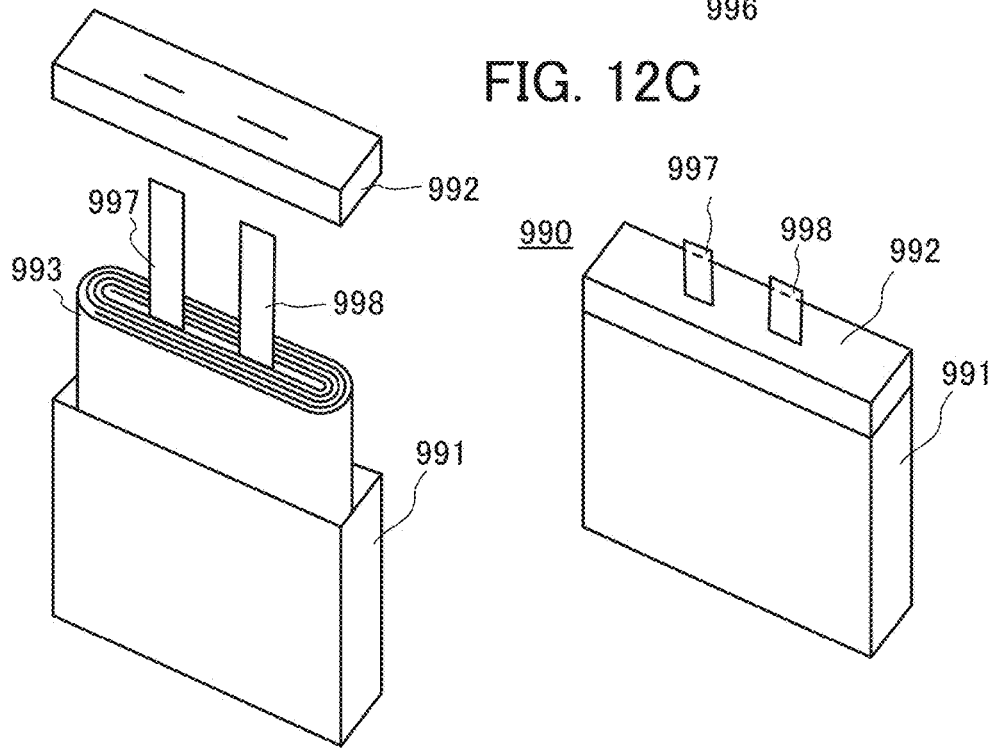

FIG. 14A1
FIG. 14A2
FIG. 14B1
FIG. 14B2
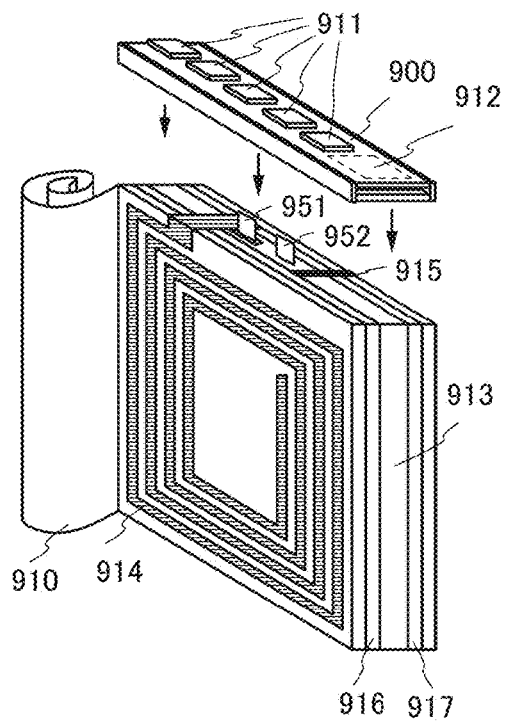
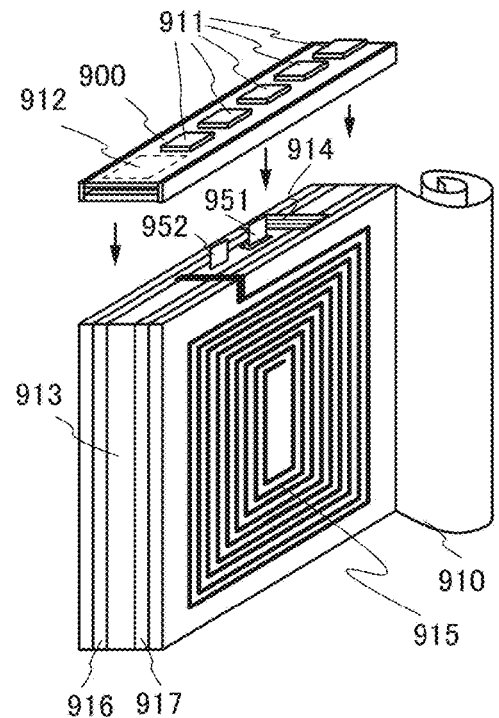
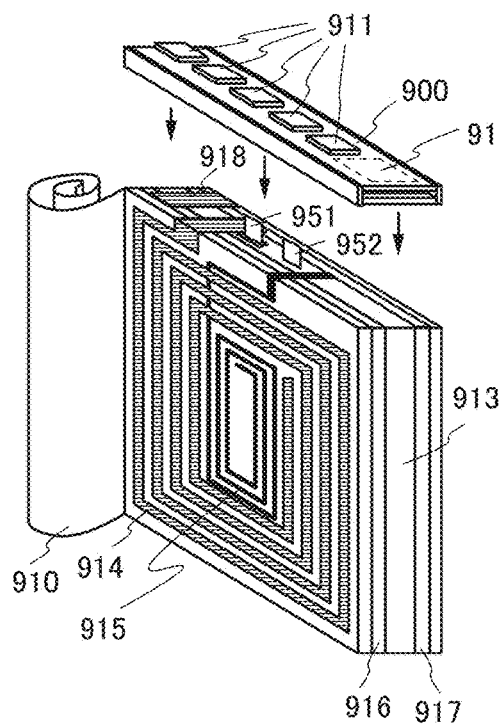
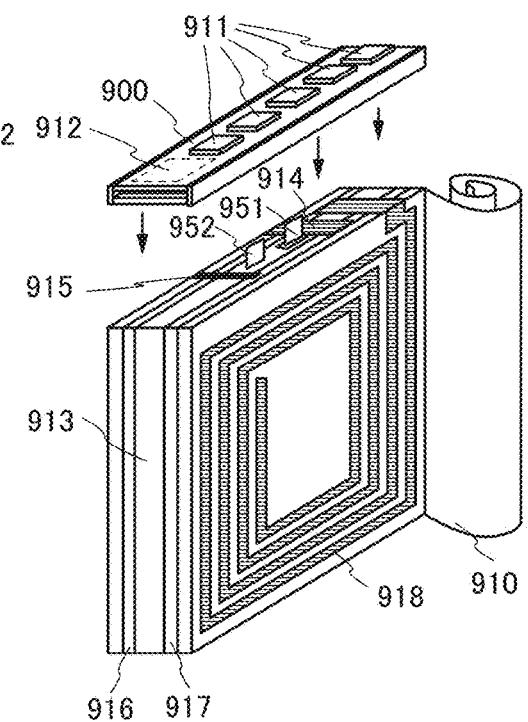

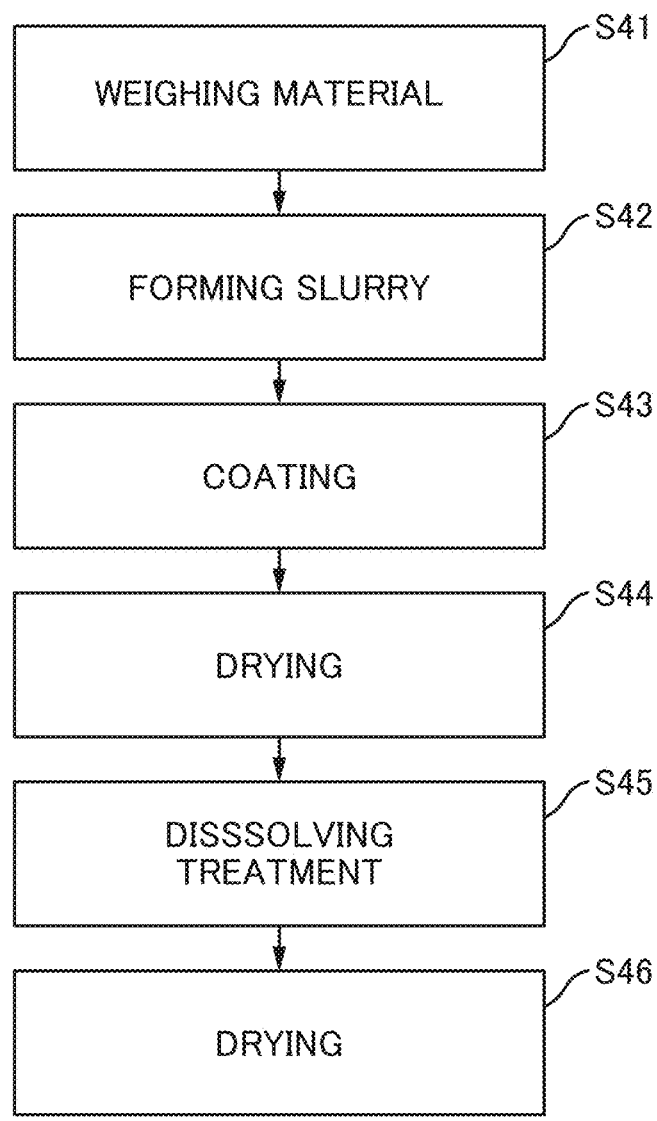

ELECTRODE MEMBER, SECONDARY BATTERY, AND METHOD FOR MANUFACTURING ELECTRODE MEMBER

BACKGROUND OF THE INVENTION

1. Field of the Invention

One embodiment of the present invention relates to an electrode member that can be used for a power storage device and a method for manufacturing the electrode member. One embodiment relates to a secondary battery and a manufacturing method thereof. In particular, one embodiment of the present invention relates to an electrode of a lithium-ion secondary battery.

Note that one embodiment of the present invention is not limited to the above technical field. The technical field of one embodiment of the invention disclosed in this specification and the like relates to an object, a method, or a manufacturing method. One embodiment of the present invention relates to a process, a machine, manufacture, or a composition of matter. Specifically, examples of the technical field of one embodiment of the present invention disclosed in this specification include a semiconductor device, a display device, a light-emitting device, a power storage device, a storage device, a method for driving any of them, and a method for manufacturing any of them.

2. Description of the Related Art

Examples of a secondary battery capable of being charged and discharged include a nickel-metal hydride secondary battery and a lithium-ion secondary battery.

Such secondary batteries are often used as power sources in portable information terminals typified by mobile phones, smartphones, and tablet terminals. In particular, lithium-ion secondary batteries have been actively developed because the capacity thereof can be increased and the size thereof can be reduced.

Electrodes serving as positive electrodes or negative electrodes of lithium-ion secondary batteries are formed using, for example, a lithium metal, a carbon-based material, or an alloy material. A lithium-ion secondary battery in which a group of whiskers including silicon is used for an electrode has been disclosed in Patent Document 1.

REFERENCE

[Patent Document 1] Japanese Published Patent Application No. 2012-018919

SUMMARY OF THE INVENTION

Active materials used for an electrode of a secondary battery repeatedly expand and contract by repeated charge and discharge; as a result, contacts between the active materials are gradually reduced in some cases. Moreover, the repeated expansion and contraction might cause separation between a current collector and an active material. The repeated expansion and contraction of the active material cause degradation of the charge and discharge cycle characteristics of a secondary battery.

An object of one embodiment of the present invention is to inhibit degradation of charge and discharge cycle characteristics of a secondary battery. Another object is to suppress generation of defects caused by expansion and contraction of an active material in a negative electrode. Another object is to provide a novel electrode member. Another object is to provide a novel power storage device. Another object is to provide a novel secondary battery.

The use of secondary batteries in display devices and electronic devices that are flexible and bendable is desired. When a secondary battery is used in a display device or an electronic device, it may be provided in a flexible portion (the whole or a part of a housing) and may be changed in its form according to a change in the form of the flexible portion. However, repeated changes in form (e.g., bending) of a secondary battery might cause separation between a current collector and an active material in the secondary battery, promoting deterioration of the secondary battery.

Another object of one embodiment of the present invention is to prevent deterioration of an electrode caused by changes in its form.

Note that the descriptions of these objects do not disturb the existence of other objects. In one embodiment of the present invention, there is no need to achieve all the objects. Other objects will be apparent from and can be derived from the descriptions of the specification, the drawings, the claims, and the like.

One embodiment of the present invention is an electrode member including a current collector, an active material, and a porous body. The porous body is in contact with one surface of the current collector and includes a plurality of spaces. The active material is located in the space in the porous body. The space has a larger size than the active material.

The size of the space is preferably larger than or equal to the size of the active material with the maximum content of carrier ions received by an electrochemical reaction.

The active material preferably contains a metal or an alloy whose melting point is lower than or equal to 250° C. It is particularly preferred that the active material contain tin or gallium.

The porous body preferably includes a carbon fiber and resin. The porous body preferably contains a flake-like or disc-like metal powder. The metal powder preferably contains copper.

One embodiment of the present invention is a secondary battery including the electrode member of one embodiment of the present invention.

Another embodiment of the present invention is a method for manufacturing an electrode member that includes a first step of forming slurry by mixing a fiber material, resin, and an alloy containing a first metal and a second metal; a second step of applying the slurry to a current collector and then drying the slurry; and a third step of performing treatment such that the second metal is released from the alloy.

It is preferred that an alkali metal be used as the second metal and at least one of alcohol and water is used to release the second metal from the alloy in the third step.

Alternatively, it is preferred that a material whose standard electrode potential is lower than that of the first metal be used as the second metal and the second metal be released by an electrochemical reaction in the third step.

According to the present invention, degradation of charge and discharge cycle characteristics of a secondary battery can be inhibited. Generation of defects due to expansion and contraction of an active material in a negative electrode can be suppressed. Deterioration of an electrode due to changes in its form can be inhibited.

A novel member can be provided. A novel electrode can be provided. A novel power storage device can be provided. A novel battery can be provided. A novel secondary battery can be provided. Note that the description of these effects does not disturb the existence of other effects. One embodiment of the present invention does not have to achieve all the objects listed above. Other effects will be apparent from and can be derived from the description of the specification, the drawings, the claims, and the like.

BRIEF DESCRIPTION OF THE DRAWINGS

In the accompanying drawings:

FIG. 4 is an example of a manufacturing flow of an electrode member of an embodiment;

FIG. 6 is an example of a manufacturing flow of an electrode member of an embodiment;

FIGS. 12A to 12C illustrate a rectangular secondary battery of an embodiment;

FIGS. 14A1, 14A2, 14B1, and 14B2 illustrate power storage devices of embodiments;

FIG. 19 is an example of a manufacturing flow of an electrode member of an embodiment;

DETAILED DESCRIPTION OF THE INVENTION

Figure 1A:
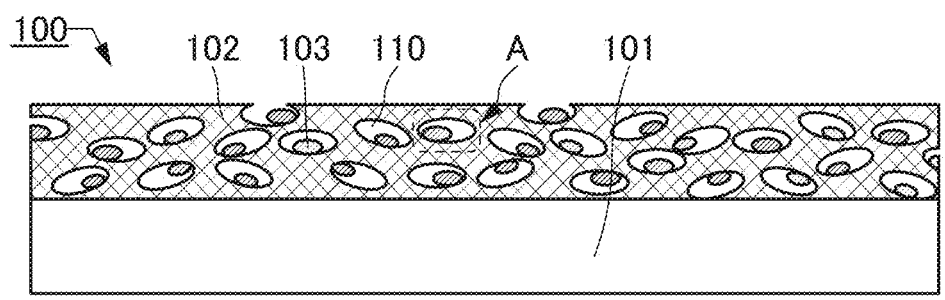
FIGS. 1A and 1B are cross-sectional views illustrating a structural example of an electrode member of an embodiment.

Embodiments and an example of the present invention will be described below in detail with reference to the drawings. However, the present invention is not limited to the descriptions below, and it is easily understood by those skilled in the art that modes and details disclosed herein can be modified in various ways. Accordingly, the present invention should not be interpreted as being limited to the descriptions of the embodiments and the example.

Note that in the structures of the invention described below, the same portions or portions having similar functions are denoted by the same reference numerals in different drawings, and descriptions of such portions are not repeated. In addition, the same hatching pattern is applied to portions having similar functions, and the portions are not especially denoted by reference numerals in some cases.

Note that in each drawing described in this specification, the size, the layer thickness, or the region of each component is exaggerated for clarity in some cases. Therefore, embodiments of the present invention are not limited to such a scale.

Embodiment 1

In this embodiment, examples of a structure and a manufacturing method of an electrode member of one embodiment of the present invention will be described with reference to drawings.

Structural Example

FIG. 1A is a schematic cross-sectional view of an electrode member 100 of one embodiment of the present invention.

The electrode member 100 includes a current collector 101, a porous body 102, and active materials 103.

The porous body 102 is provided in contact with one surface of the current collector 101 and includes a plurality of spaces 110. The active materials 103 are located in the spaces 110 in the porous body 102.

Figure 1B:
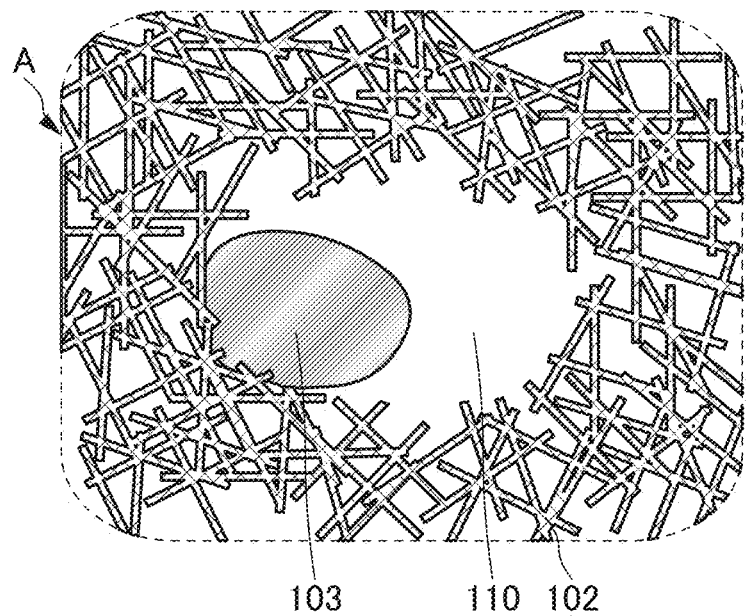

FIG. 1B is an enlarged schematic cross-sectional view of a region A indicated by a broken line in FIG. 1A.

The porous body 102 has a function as a skeleton for binding the active materials 103 or binding the active material 103 and the current collector 101. The porous body 102 preferably includes a conductive additive and resin. For example, a plurality of fiber conductive additives can be bound by resin. The amount of resin may be small as long as the resin can bind the conductive additives, and the volume ratio of the resin to the conductive additives is preferably low. The conductive additives facilitate electrical connection between the active materials 103 or between the active material 103 and the current collector 101 and help to maintain the current collection of the electrode.

Examples of resin that can be used in the porous body 102 include polyvinylidene fluoride (PVDF), polyimide, polytetrafluoroethylene, polyvinyl chloride, ethylene-propylenediene polymer, styrene-butadiene rubber, acrylonitrile-butadiene rubber, fluorine rubber, polyvinyl acetate, polymethyl methacrylate, polyethylene, and nitrocellulose.

A fiber conductive material such as a vapor-grown carbon fiber (VGCF) is preferably employed for the conductive additive used in the porous body 102. The representative values of VGCF are as follows: the fiber diameter is 150 nm; the fiber length is 10 μm to 20 μm, inclusive; the real density is 2 g/cm$^3$; and the specific surface area is 13 m$^2$/g. Note that when a cross section perpendicular to a fiber axis is regarded as a cutting plane in a two-dimensional SEM image, the fiber diameter is a diameter of a perfect circle that circumscribes the cutting plane. The real density is a density calculated using a volume occupied by a substance itself. The specific surface area is the surface area of an object per unit mass or per unit volume. Alternatively, a particle-like material can be used for the conductive additive. A typical example of the particle-like material is carbon black, such as acetylene black or ketjen black, whose diameter is 3 nm to 500 nm, inclusive.

The fiber-like material that can be used for the porous body 102 has a function of binding the active materials 103 and inhibits deterioration of a battery. The fiber-like material also functions as a structure body or cushioning for maintaining the shape of the porous body 102. That is to say, by using the fiber-like material, separation between the current collector 101 and the active materials 103 is less likely to occur even when a secondary battery is changed in its form by being bent or by repeated expansion and contraction of the active materials 103. Although carbon black such as acetylene black or ketjen black may be used instead of the fiber-like material, VGCF is preferably used because the strength for keeping the shape of the porous body 102 can be increased. When the strength for keeping the shape of the porous body 102 is high, deterioration of the secondary battery caused by changes in its form (e.g., bending) can be prevented.

The porous body 102 includes original pores of a porous material included in the porous body 102 and the spaces (also referred to as voids, cavities, or hollows) 110.

In this specification and the like, the size of a pore refers to the mean value of the sizes of a plurality of pores in a porous material. Examples of indices of the pore size include the mean value of the diameters of spheres inscribed in respective pores in a porous material, the mean value of the volumes of ellipsoids (including spheres) inscribed in respective pores, and the mean value of areas of circles or ellipses inscribed in respective pores in a cross section of the porous material.

In addition, the space 110 in the porous body 102 in this specification and the like refers to a hole larger than a pore included in a porous material used for the porous body 102. For example, in the case where the diameter of a sphere inscribed in a hole included in the porous body 102 is larger than the mean value of the diameters of spheres inscribed in pores included in a porous material used for the porous body 102, the hole can be called the space 110. In addition, in the case where the volume of an ellipsoid (or a sphere) inscribed in a hole is larger than the mean value of the volumes of ellipsoids (including spheres) inscribed in respective pores included in a porous material used for the porous body 102, the hole can be called the space 110. In addition, in the case where the area of a circle or an ellipse inscribed in a hole is larger than the mean value of the areas of circles or ellipses inscribed in respective holes included in a porous material used for the porous body 102 in a cross section of the porous body 102, the hole can be called the space 110.

The active material 103 is located in the space 110 included in the porous body 102. At least part of the active material 103 is in contact with the porous body 102. Thus, the active material 103 and the porous body 102 are electrically connected to each other.

The electrode member 100 can function either as a positive electrode or as a negative electrode depending on a material of the active material 103. Thus, either a positive electrode active material for a positive electrode or a negative electrode active material for a negative electrode can be used as the active material 103. Here, the case will be described in which a negative electrode active material is used as the active material 103.

A material which enables a charge-discharge reaction by being alloyed and dealloyed with carrier ions can be used as the active material 103. For example, a material containing at least one of C, Mg, Ca, Al, Si, Ge, Sn, Pb, As, Sb, Bi, Ag, Zn, Cd, Hg, In, etc. can be used. Such materials have higher capacity than carbon. In particular, silicon has a significantly high theoretical capacity of 4200 mAh/g. For this reason, silicon is preferably used as the negative electrode active material.

Furthermore, a material containing a metal or alloy having a low melting point (e.g., 250° C. or lower) is preferably used as the active material 103. For example, a low-melting-point metal such as gallium (Ga), mercury (Hg), indium (In), or tin (Sn), or an alloy or compound containing any of these low-melting-point metals can be used. For example, an In—Ga alloy, an In—Sn alloy, a Ga—Sn alloy, or an In—Ga—Sn alloy (also referred to as galinstan) can be used. In particular, a material containing gallium is preferably used.

As illustrated in FIG. 1B, the active material 103 is surrounded by the porous body 102. This can prevent the active material 103 from being released from the electrode member 100, effectively inhibiting degradation of charge and discharge cycle characteristics. In particular, even in the case of using gallium that is liquid at room temperature for example, the porous body 102 can retain the active material 103.

The size of the space 110 is preferably larger than that of the active material 103, or more preferably, larger than or equal to the size of the active material 103 with the maximum content of carrier ions received by an electrochemical reaction. Alternatively, the porous body 102 preferably includes the space 110 that is large enough to leave a clearance between the active material 103 and the porous body 102 when the active material 103 does not include carrier ions in the space 110. In other words, it is preferred that the active material 103 that does not include carrier ions in the space 110 not occupy the space 110 or not extend to a pore around the space 110.

For example, in the case where gallium is used as the active material 103 and lithium ions are used as carrier ions, the composition of gallium with the maximum content of lithium received by an electrochemical reaction is $Li_2Ga$. The volume of the alloy of gallium and lithium increases to be approximately 2.42 times that of gallium. For this reason, the size of the space 110 is preferably larger than the volume of gallium that has not yet reacted with lithium, or more preferably, more than 2.42 times as large as the volume of the gallium.

The space 110 with such a size prevents interference with the porous body 102 and damage to the porous body 102 when the volume of the active material 103 increases as it is alloyed with carrier ions. This can effectively inhibit degradation of charge and discharge cycle characteristics.

Figure 2A:
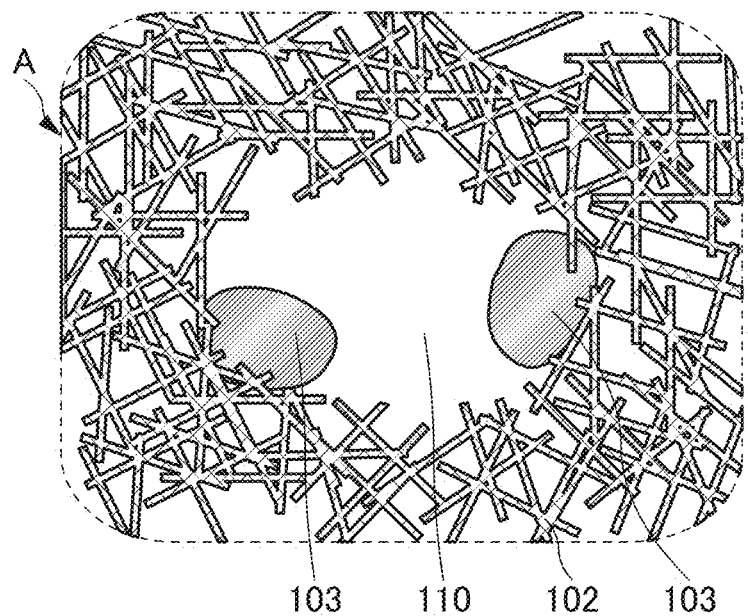
FIGS. 2A and 2B are cross-sectional views each illustrating a structural example of an electrode member of an embodiment.

Although FIGS. 1A and 1B illustrate the case where one active material 103 is provided in each of the plurality of spaces 110 in the porous body 102, the plurality of active materials 103 may be provided in one space 110. For example, FIG. 2A illustrates the example where two active materials 103 are included in one space 110.

Figure 2B:
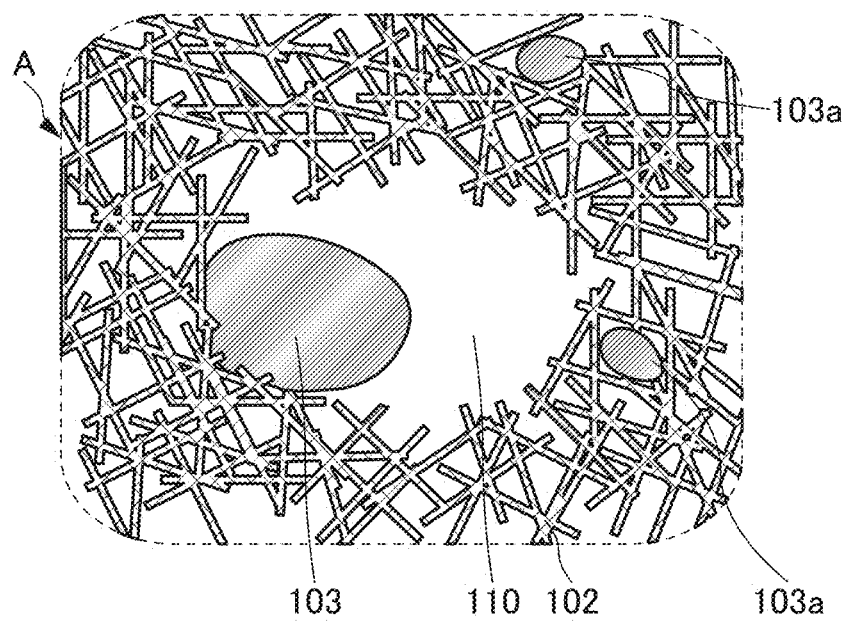

Note that like an active material 103a in FIG. 2B, the active material 103a whose size is smaller than that of the active material 103 located in the space 110 may be located in one pore in the porous body 102 or located so as to occupy a plurality of pores in the porous body 102. When the porous body 102 includes the active material 103a located in the pore as well as the active material 103 located in the space 110 in such a manner, capacity per unit volume of an electrode can be increased.

Figure 3A:
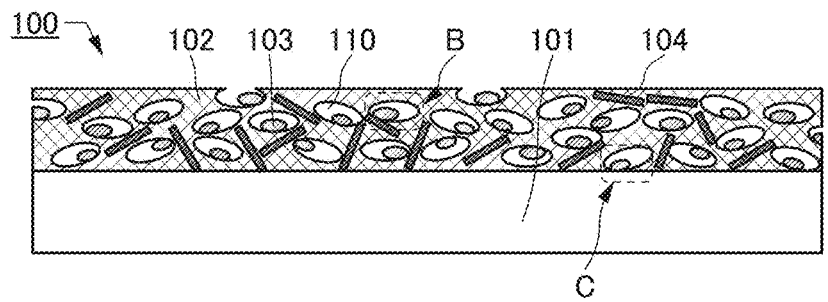
FIGS. 3A to 3C are cross-sectional views illustrating a structural example of an electrode member of an embodiment.

It is preferred that flake-like or disc-like metal powder 104 be dispersed in the porous body 102 as illustrated in FIG. 3A. The metal powder 104 facilitates electrical connection between the active materials 103 or between the active material 103 and the current collector 101 and helps to maintain the current collection of the electrode.

Here, an alloy in contact with both the active material 103 and the metal powder 104 preferably exists between the active material 103 and the metal powder 104. In that case, the alloy preferably contains both a metal contained in the metal powder 104 and a metal contained in the active material 103. Similarly, an alloy in contact with both the active material 103 and the current collector 101 preferably exists between the active material 103 and the current collector 101.

A material that is alloyed with the current collector 101 is preferably used as the active material 103. With such a material, an alloy that contains both the metal contained in the current collector 101 and the metal contained in the active material 103 can be formed easily between the current collector 101 and the active material 103. For example, it is preferred that the current collector 101 and the active material 103 be made in contact with each other so that alloying is caused near the contact interface. Similarly, a material that is alloyed with the active material 103 is used for the metal powder 104, whereby an alloy can be easily formed between the metal powder 104 and the active material 103.

The alloy between the active material 103 and the current collector 101 improves the adhesion between the current collector 101 and the active material 103, and separation can be suppressed even when the active material 103 expands or contracts or the electrode member 100 is changed in its form.

Figure 3B:
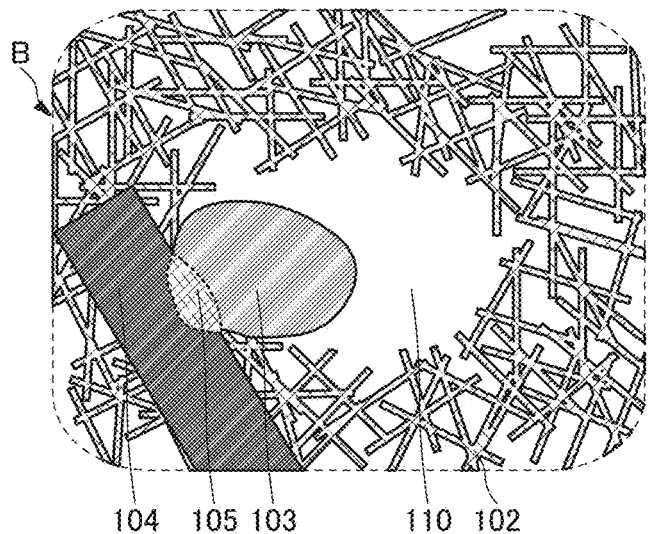

FIG. 3B is an enlarged schematic cross-sectional view of a region B indicated by a broken line in FIG. 3A. FIG. 3B illustrates the case where the active material 103 and the metal powder 104 are in contact with each other and an alloy 105 is formed between the active material 103 and the metal powder 104.

Figure 3C:
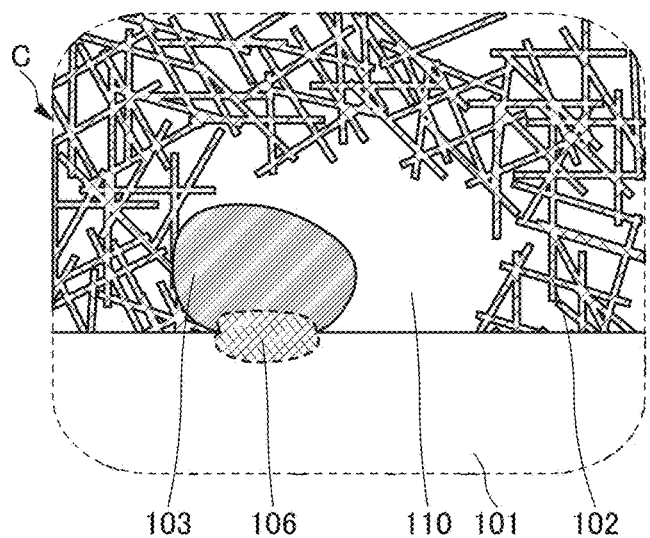

FIG. 3C is an enlarged schematic view of a region C indicated by a broken line in FIG. 3A. FIG. 3C illustrates the case where the active material 103 and the current collector 101 are in contact with each other and an alloy 106 is formed between the active material 103 and the current collector 101.

The alloying described above can be observed as differences in contrast by cross-section observation using, for example, a scanning electron microscope (SEM) or a scanning transmission electron microscope (STEM). Furthermore, the existence of the alloy can be observed by X-ray diffraction (XRD), energy dispersive X-ray spectroscopy (EDX), or the like. For example, when gallium is used for the active material 103 and copper is used for the current collector 101 or the metal powder 104, an alloy such as $CuGa_2$ can be observed.

The above is the description of a structural example.

Manufacturing Method Example 1

An example of a method for manufacturing the electrode member 100 described in the above structural example will be described below. FIG. 4 is a flow chart of the manufacturing method described below.

Materials of the electrode member 100 are prepared and weighed (S11). Here, a first metal to be an active material, a second metal to be alloyed with the first metal, a conductive additive and resin, which are components of the porous body 102, and the metal powder 104, and the like are weighed.

A material that can be used as the active material 103 can be used as the first metal.

A metal that is capable of being alloyed with the first metal is used as the second metal. A material that is easily removed by dealloying treatment performed later is preferably used. For example, a metal that is used for carrier ions, an alkali metal, or a metal having a lower standard electrode potential than the first metal can be used as the second metal. In the case of using gallium as the first metal, for example, an alkali metal that can be used for carrier ions (e.g., lithium) or a metal having a lower standard electrode potential than gallium (e.g., aluminum) is used as the second metal.

The compounding ratio of the first metal to the second metal is preferably adjusted appropriately in consideration of the volume of an alloy to be formed. Specifically, the compounding ratio is determined such that the volume density of the alloy of the first metal and the second metal is higher than or equal to the volume density of the first metal with the maximum content of a metal used for carrier ions that is received by an electrochemical reaction. In the case of using a metal used for carrier ions as the second metal, the compounding ratio of the first metal to the second metal is adjusted in accordance with the composition of the first metal with the maximum content of the carrier ions received by an electrochemical reaction.

Then, the first metal and the second metal are mixed using a mixer or the like (First mixing: S12). Here, a liquid such as a solvent may be added to facilitate the mixing. Furthermore, an electrolytic solution may be added to promote an alloying reaction. For example, when lithium is used as the second metal, a compound such as $LiPF_6$ can be used.

The first metal and the second metal can be alloyed with each other at this stage.

Then, washing is performed to remove an organic substance such as the remaining solvent or electrolytic solution (S13), and the mixed material is dried (S14).

Subsequently, the conductive additive and the resin, which are components of the porous body 102, the metal powder 104, and the like are mixed into the dried mixed material and second mixing is performed using a mixer or the like to form first slurry (S15). At this time, a solvent or the like is added to make the viscosity suitable for an application step to be performed later. Next, A surface of the current collector 101 is coated with the first slurry (S16). After that, the first slurry is dried by vaporizing the solvent or the like (S17).

Figure 5A:
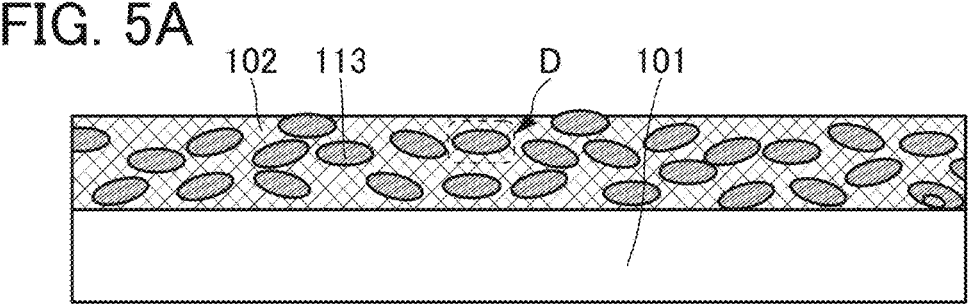
FIGS. 5A and 5B are cross-sectional views illustrating a structural example of an electrode member of an embodiment that is being manufactured.
Figure 5B:
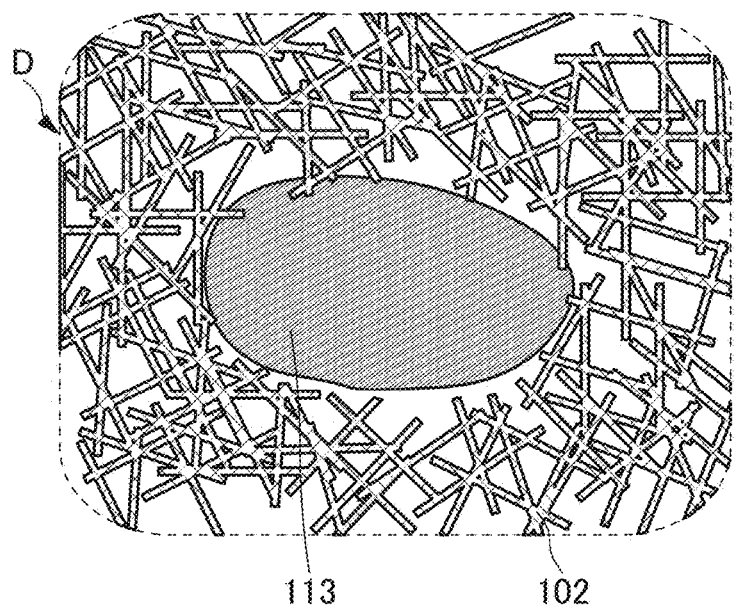

A schematic cross-sectional view at this stage is illustrated in FIGS. 5A and 5B. FIG. 5B is an enlarged schematic cross-sectional view of a region D indicated by a broken line in FIG. 5A. As illustrated in FIGS. 5A and 5B, alloys 113 of the first metal and the second metal are scattered in the porous body 102 at this stage.

Subsequently, dealloying treatment is performed to remove the second metal (S18). The dealloying treatment is not particularly limited as long as it can remove only the second metal.

For example, in the case of using an alkali metal as the second metal, the second metal can be removed from the alloy 113 by soaking the alloy 113 is in alcohol, water, or the like. For example, the following formulas are Reaction formula 1 of the case where gallium and lithium are used as the first metal and the second metal, respectively, and alcohol (ROH) is used for dealloying treatment and Reaction formula 2 of the case where gallium and lithium are used as the first metal and the second metal, respectively, and water is used for dealloying treatment.

[Formula 1]

$$Li_2Ga + 2ROH \rightarrow 2ROLi + H_2 + Ga \quad (1)$$

$$Li_2Ga + 2H_2O \rightarrow 2LiOH + H_2 + Ga \quad (2)$$

In the case where a material having a lower standard electrode potential than the first metal is used as the second metal, the second metal can be removed from the alloy 113 utilizing a spontaneous electrochemical reaction.

When the second metal is removed from the alloy 113, the active material 103 whose volume is reduced compared to that of the alloy 113 is formed as illustrated in FIGS. 1A and 1B. At the same time, the plurality of spaces 110 whose volumes are each equal to that of the alloy 113 are formed in the porous body 102. As a result, the electrode member 100 where the active materials 103 are provided in the spaces 110 in the porous body 102 can be formed.

Note that in the case where the second metal is the same as a metal used for carrier ions of a battery, the second metal does not have to be completely removed by the dealloying treatment. A battery fabricated to have a structure where the second metal serving as carrier ions remains in the active material 103 is the one doped with carrier ions in advance (pre-doped with carrier ions).

Furthermore, a step of pressing the applied layer may be performed between the drying step (S17) and the dealloying treatment (S18). The pressing step can increase the density of the porous body 102 and the capacity per unit volume of the electrode. When pressing is performed before the dealloying treatment, spaces with sufficiently large sizes can be formed in the porous body 102 even after the density of the porous body 102 is increased.

The above is the description of Manufacturing Method Example 1.

In the above-described manner, the electrode member of one embodiment of the present invention can be manufactured. With the use of the electrode member of one embodiment of the present invention, various power storage devices can be manufactured. Examples of the power storage devices are a battery, a secondary battery, and a lithium-ion secondary battery. In addition, a capacitor is given as another example of the power storage devices. For example, with a combination of the electrode member of one embodiment of the present invention as a negative electrode and an electric double layer positive electrode, a capacitor such as a lithium-ion capacitor can be manufactured.

Modification Example

An example of a method for manufacturing an electrode member that is partly different from the above manufacturing method will be described below. Note that descriptions of the portions already described are omitted and different portions are described. The manufacturing method in this modification example is different from the above manufacturing method in that a coating layer having a structure similar to that of the porous body 102 is formed over the porous body 102.

FIG. 6 is a flow chart of the manufacturing method described below.

For the steps S11 to S17, the above manufacturing method can be referred to.

Besides the above steps, materials (e.g., a conductive additive and resin) that can be used for the porous body 102 are weighed (S21). Then, the weighed materials are mixed using a mixer or the like to form second slurry (S22). At this time, a solvent is added to make the viscosity suitable for an application step as in the step S15. Note that the metal powder 104 may be mixed into the second slurry.

A surface of the current collector dried in the step S17 is coated with the second slurry (S31). After that, the second slurry is dried by vaporizing the solvent (S32).

Lastly, dealloying treatment is performed by a method similar to that of the above dealloying treatment (S33).

With such a manufacturing method, a layer coating the porous body 102 (referred to as a coating layer) can be formed using materials similar to those of the porous body 102. The coating layer can effectively prevent the active material 103 from being released from the porous body 102, effectively inhibiting degradation of the charge and discharge cycle characteristics.

Note that the pressing step described above may be performed before the dealloying treatment (S33) to increase the densities of the porous body 102 and the coating layer. The pressing step can be performed immediately after the drying step (S17), directly after the drying step (S32), or at both the stages.

The above is the description of the modification example.

Manufacturing Method Example 2

An example of a method for manufacturing an electrode member that is partly different from Manufacturing Method Example 1 will be described below. Note that portions similar to those described above are not described in some cases. In particular, a manufacturing method without using the second metal will be described here.

FIG. 19 is a flow chart of the manufacturing method described below.

First, materials of an electrode member are prepared and weighed (S41). Here, a first metal to be an active material, a conductive additive and resin, which are components of the porous body 102, and the metal powder 104, and the like are weighed.

Subsequently, the first metal, the conductive additive and the resin, which are components of the porous body 102, the metal powder 104, and the like are mixed in a mixer or the like to form slurry (S42). At this time, a solvent or the like is added to make the viscosity suitable for an application step to be performed later. Next, a surface of the current collector 101 is coated with the slurry (S43). After that, the slurry is dried by vaporizing the solvent, for example (S44).

At this stage, the alloys 113 in the schematic cross-sectional view illustrated in FIGS. 5A and 5B are replaced with the first metals. In other words, the first metals are scattered in the porous body 102 and the spaces 110 are not formed in the cross section.

Moreover, at this stage, pressing is preferably performed on the current collector 101 to which the slurry is applied. The pressing can reduce excess voids to increase the volume density, decreasing the volume of the electrode member.

Subsequently, the first metal in the current collector 101 to which the slurry is applied is partly dissolved (disssolving treatment: S45).

The dissolving treatment is preferably performed using a liquid that hardly dissolves the current collector 101, the porous body 102, and the like and dissolves the first metal. For example, a liquid containing a material that is more likely to be ionized than a material of the current collector; a diluted acid or the like can be used.

For example, in the case where gallium and copper are used as the first metal and the current collector 101, respectively, a diluted hydrochloric acid is preferably used as a liquid for dissolving treatment. Here, the reaction of gallium and a hydrochloric acid is expressed by the following reaction formula.

[Formula 2]

$$2Ga + 6HCl \rightarrow 2GaCl_3 + 3H_2 \quad (3)$$

The current collector 101 to which the slurry is applied is soaked in such a liquid, whereby the first metal can be partly dissolved. The time for the soak is adjusted appropriately according to the concentration or the temperature of the liquid. Reducing the concentration of the solution facilitates controlling the dissolution amount of the first metals by time, so that variations in the rate at which the first metals are dissolved can be reduced. For example, the current collector 101 to which the slurry is applied is soaked in a 1M dilute hydrochloric acid at room temperature for approximately 13 hours to 14 hours.

By dissolving part of the first metal without dissolving the current collector 101 and the porous body 102, the porous body 102 illustrated in FIGS. 1A and 1B or the like and the active material 103 including the first metal as its main component and the space 110 in the porous body 102 can be formed.

After that, a liquid that dissolves the first metal is removed by washing and drying is performed, so that the electrode member can be obtained.

With such a manufacturing method, the electrode member can be manufactured without using the second metal. This manufacturing method allows safe manufacture of the electrode member even in the air because some alkali metals that can be used for the second metal have high reactivity. Thus, a manufacturing apparatus and a manufacturing environment of the electrode member can be simplified.

The above is the description of Manufacturing Method Example 2.

[Example of Charging Method]

An example of a method for charging a secondary battery that improves the cycle characteristics will be described below.

A factor of degradation of the charge and discharge cycle characteristics of a secondary battery is a phenomenon where part of an active material and a current collector are electrically disconnected from each other and part of the active material does not contribute to charge and discharge. Particularly in the case of using a low-melting-point metal material, which has high surface tension in a liquid state, as an active material, part of the active material is deposited in a spherical form on the surface of an electrode member and does not contribute to charge and discharge in some cases.

For example, in the case where gallium and lithium ions are used as an active material and carrier ions, respectively, a lithium-gallium alloy ($Li_xGa$), which is a solid, might cause the following problem. For example, unreacted gallium between adjacent crystal grains might be pushed out by an increase in the volume of the crystal grains and deposited on the surface of an electrode member in a formation process of a lithium-gallium alloy by an alloying reaction. To prevent this phenomenon, grain boundaries are eliminated by single crystallization of a lithium-gallium alloy or grain boundaries are increased by reduction in the size of the crystal grains, so that deposition of gallium can be inhibited.

In the formation process of a crystal, a seed crystal is generated first and crystal growth occurs from the seed crystal. Thus, increasing the number of seed crystals can reduce the sizes of crystal grains. In contrast, inhibiting generation of seed crystals enables substantial single crystallization. The number of seed crystals to be generated can be controlled by the amount of current flowing through an electrode member, for example. Increasing the amount of current can increase the generation number of seed crystals.

Figure 20:
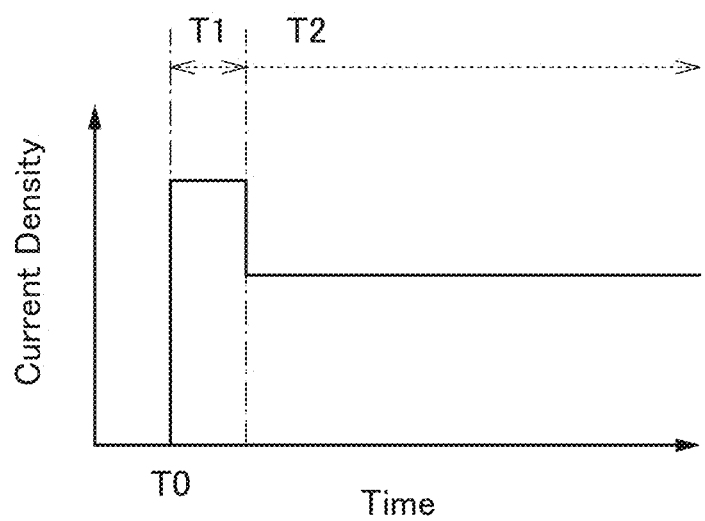
FIG. 20 illustrates a method for driving a secondary battery of an embodiment.

Here, charging time means the time during which carrier ions are inserted into an active material. In this case, it is preferred that the current density be set such that the charge rate is, for example, 0.1 C or more, preferably 0.5 C or more, more preferably 1.0 C or more at the initial stage of a charge reaction. To control the density of current that flows through a current collector from charge start time T0, a control method where the above charge rate in a first period T1 is higher than the charge rate in normal use in a second period T2 as in FIG. 20 is preferably employed.

Such a charging method allows suppression of electrical disconnection between part of an active material and a current collector, improving cycle characteristics.

Usage Example

A usage example of a secondary battery that can improve cycle characteristics will be described below.

There may be the case where a plurality of alloyed states are caused in performing charge and discharge by an alloying reaction between an active material and carrier ions. In that case, the potential might be changed depending on the composition.

Figure 21A:
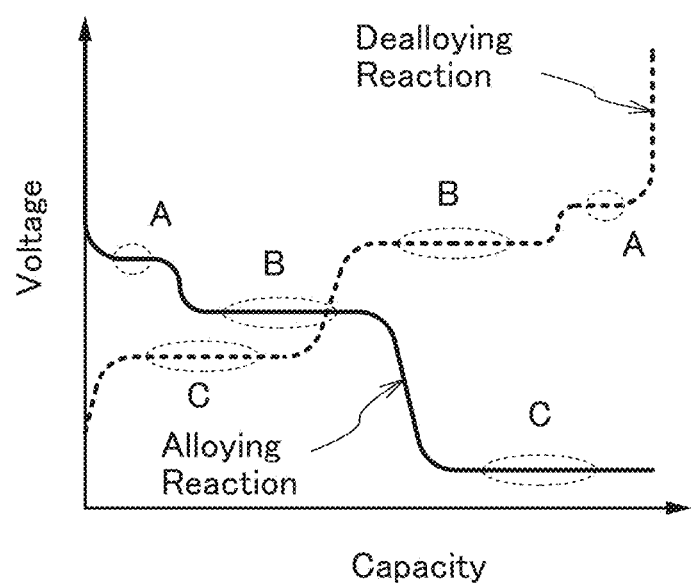
FIGS. 21A and 21B are graphs showing examples of charge and discharge curves of a secondary battery of an embodiment.

FIG. 21A is a schematic graph showing charge and discharge curves when a plurality of alloyed states are present. The solid line and the broken line in the graph represent an alloying reaction and a dealloying reaction, respectively.

In the case where gallium and lithium ions are used for an active material and carrier ions, respectively, there are three major types of alloyed states. The charge and discharge curves each have three constant potential regions (regions A, B, and C) in the reaction process. As illustrated in FIG. 21A, the potential is constant in a period when an intercalation/deintercalation reaction continues.

The region A corresponds to a period when a lithium intercalation/deintercalation reaction continues between Ga and $Li_2Ga_7$. The region B corresponds to a period when a lithium intercalation/deintercalation reaction continues between $Li_2Ga_7$ and LiGa. The region C corresponds to a period when a lithium intercalation/deintercalation reaction continues between LiGa and $Li_2Ga$.

Here, in the case of using a low-melting-point material as an active material, the active material is in a liquid state in some cases depending on the temperature at which a secondary battery is used. When the active material is alloyed with carrier ions, the melting point is raised and the alloy can easily exist in a sold form even at the same temperature. When liquefaction and solidification of the active material are repeated by repeated charge and discharge, the form of the active material is not stable, which might cause variations in characteristics.

For example, in the case where gallium and lithium ions are used for an active material and carrier ions, respectively, gallium is in a liquid state at room temperature, whereas a gallium-lithium alloy (e.g., $Li_2Ga_7$, LiGa, or $Li_2Ga$), which has a higher melting point than gallium, is in a solid state at room temperature.

Thus, carrier ions are not completely extracted from an active material in a dealloying reaction and an alloyed state is maintained, whereby reliability and cycle characteristics can be improved.

Figure 21B:
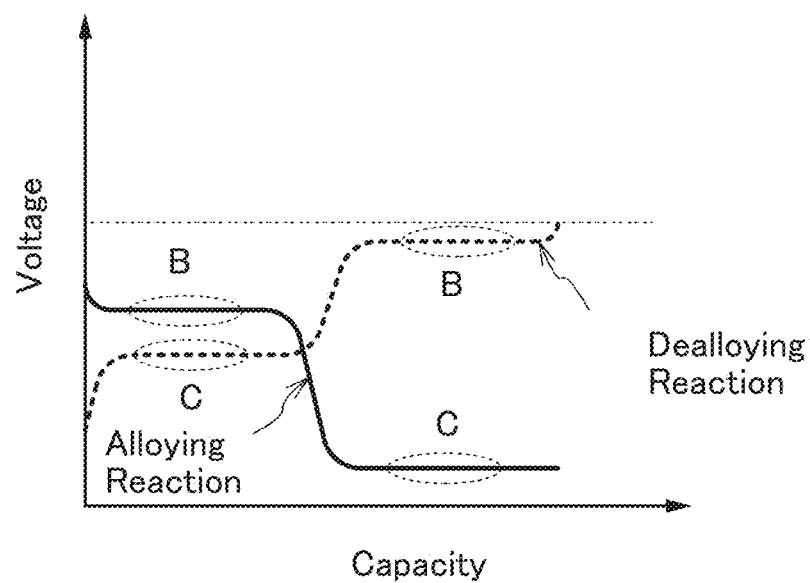

For example, when a dealloying reaction (broken line) is stopped in the middle of the potential increase after the region B as shown in FIG. 21B, carrier ions can be prevented from being completely extracted from a current collector. Specifically, the dealloying reaction can be stopped before dealloying from an alloy to gallium occurs. At this time, a charge and discharge system is preferably provided with a mechanism that monitors the voltage constantly or at regular intervals and stops the use of a secondary battery when the voltage reaches a predetermined value. After that, an alloying reaction can proceed until the end of the reaction between the current collector and carrier ions.

As described above, it is preferred that a secondary battery be used such that carrier ions are not completely extracted from an active material in the extraction reaction of carrier ions from an active material in an electrode member where charge and discharge reactions are caused through a plurality of alloyed states. In other words, a secondary battery is preferably used while an active material is maintained in an alloyed state with carrier ions. Such a method leads to higher reliability of the secondary battery.

At least part of this embodiment can be implemented in combination with any of the other embodiments described in this specification as appropriate.

Embodiment 2

[Coin-Type Storage Battery]

Figure 7A:
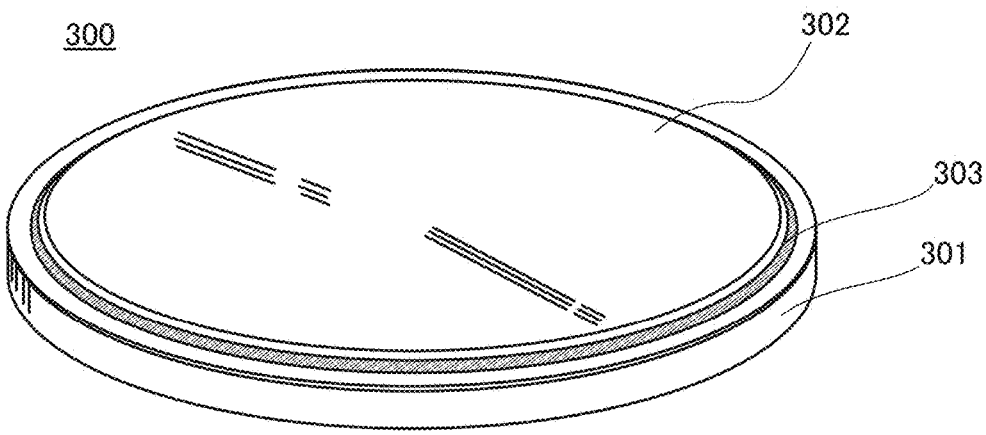
FIGS. 7A to 7C illustrate a coin-type secondary battery of an embodiment.
Figure 7B:
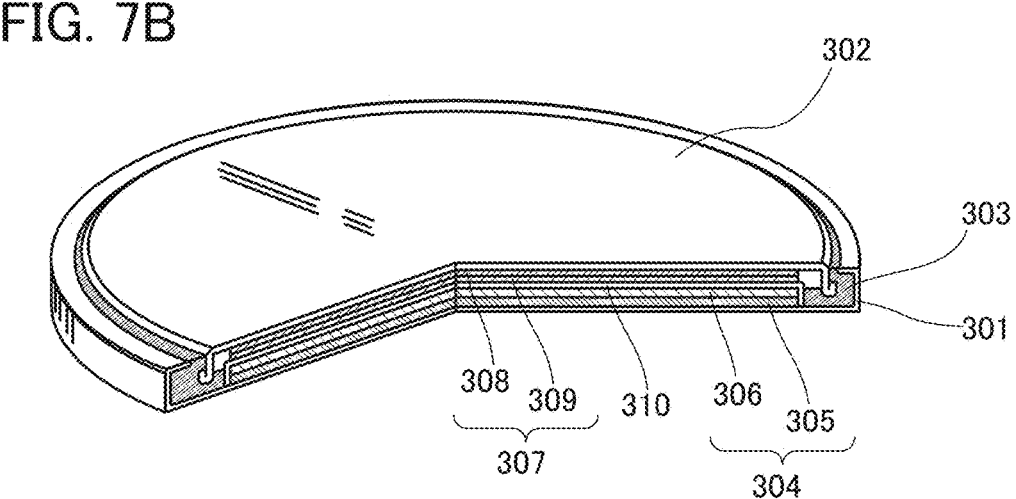

FIG. 7A is an external view of a coin-type (single-layer flat type) storage battery, and FIG. 7B is a cross-sectional view thereof.

In a coin-type storage battery 300, a positive electrode can 301 doubling as a positive electrode terminal and a negative electrode can 302 doubling as a negative electrode terminal are insulated from each other and sealed by a gasket 303 made of polypropylene or the like. A positive electrode 304 includes a positive electrode current collector 305 and a positive electrode active material layer 306 provided in contact with the positive electrode current collector 305. The positive electrode active material layer 306 may further include a binder for increasing adhesion of positive electrode active materials, a conductive additive for increasing the conductivity of the positive electrode active material layer, and the like in addition to the active materials. As the conductive additive, a material that has a large specific surface area is preferably used; for example, acetylene black (AB) can be used. Alternatively, a carbon material such as a carbon nanotube, graphene, or fullerene can be used. Graphene is flaky and has an excellent electrical characteristic of high conductivity and excellent physical properties of high flexibility and high mechanical strength. Thus, the use of graphene as the conductive additive can increase contact points and the contact area of active materials. Note that graphene in this specification refers to single-layer graphene or multilayer graphene including two or more and a hundred or less layers. Single-layer graphene refers to a one-atom-thick sheet of carbon molecules having π bonds.

A negative electrode 307 includes a negative electrode current collector 308 and a negative electrode active material layer 309 provided in contact with the negative electrode current collector 308. The negative electrode active material layer 309 includes the active material 103, the porous body 102, and the like illustrated in Embodiment 1. The negative electrode active material layer 309 may further include a binder for increasing adhesion of negative electrode active materials, a conductive additive for increasing the conductivity of the negative electrode active material layer, and the like. A separator 310 and an electrolyte (not illustrated) are provided between the positive electrode active material layer 306 and the negative electrode active material layer 309.

The material described in Embodiment 1 (e.g., gallium) is used as the negative electrode active material in the negative electrode active material layer 309. For example, copper is used as the negative electrode current collector 308, and copper and gallium are alloyed. The adhesion between the current collector and the active material (gallium) is improved by the alloying, and thus deterioration due to expansion and contraction or deterioration of a secondary battery due to change in its form (e.g., bending) can be prevented. Furthermore, the porous body included in the negative electrode active material layer 309 enables the negative electrode active material to be reliably held over a surface of the current collector; thus, degradation of the characteristics of the secondary battery can be inhibited.

The current collectors 305 and 308 can each be formed using a highly conductive material which is not alloyed with a carrier ion of lithium among other elements, such as a metal typified by stainless steel, gold, platinum, zinc, iron, nickel, copper, aluminum, titanium, and tantalum or an alloy thereof. Alternatively, an aluminum alloy to which an element which improves heat resistance, such as silicon, titanium, neodymium, scandium, and molybdenum, is added can be used. Still alternatively, a metal element which forms silicide by reacting with silicon can be used. Examples of the metal element which forms silicide by reacting with silicon include zirconium, titanium, hafnium, vanadium, niobium, tantalum, chromium, molybdenum, tungsten, cobalt, nickel, and the like. The current collectors can each have a foil-like shape, a plate-like shape (sheet-like shape), a net-like shape, a cylindrical shape, a coil shape, a punching-metal shape, an expanded-metal shape, or the like as appropriate. The current collectors each preferably have a thickness of 5 μm to 30 μm inclusive.

Examples of a positive electrode active material used for the positive electrode active material layer 306 include a composite oxide with an olivine crystal structure, a composite oxide with a layered rock-salt crystal structure, and a composite oxide with a spinel crystal structure. As the positive electrode active material, a compound such as $LiFeO_2$, $LiCoO_2$, $LiNiO_2$, $LiMn_2O_4$, $V_2O_5$, $Cr_2O_5$, and $MnO_2$ can be used.

Alternatively, a complex material ($LiMPO_4$ (general formula) (M is one or more of Fe(II), Mn(II), Co(II), and Ni(II))) can be used. Typical examples of the general formula $LiMPO_4$ which can be used as a material are lithium compounds such as $LiFePO_4$, $LiNiPO_4$, $LiCoPO_4$, $LiMnPO_4$, $LiFe_aNi_bPO_4$, $LiFe_aCo_bPO_4$, $LiFe_aMn_bPO_4$, $LiNi_aCo_bPO_4$, $LiNi_aMn_bPO_4$ (a+b≤1, 0<a<1, and 0<b<1), $LiFe_cNi_dCo_ePO_4$, $LiFe_cNi_dMn_ePO_4$, $LiNi_cCo_dMn_ePO_4$ (c+d+e≤1, 0<c<1, 0<d<1, and 0<e<1), and $LiFe_fNi_gCo_hMn_iPO_4$ (f+g+h+i≤1, 0<f<1, 0<g<1, 0<h<1, and 0<i<1).

Alternatively, a complex material such as $Li_{(2-j)}MSiO_4$ (general formula) (M is one or more of Fe(II), Mn(II), Co(II), and Ni(II); 0≤j≤2) may be used. Typical examples of the general formula $Li_{(2-j)}MSiO_4$ which can be used as a material are lithium compounds such as $Li_{(2-j)}FeSiO_4$, $Li_{(2-j)}NiSiO_4$, $Li_{(2-j)}CoSiO_4$, $Li_{(2-j)}MnSiO_4$, $Li_{(2-j)}Fe_kNi_lSiO_4$, $Li_{(2-j)}Fe_kCo_lSiO_4$, $Li_{(2-j)}Fe_kMn_lSiO_4$, $Li_{(2-j)}Ni_kCo_lSiO_4$, $Li_{(2-j)}Ni_kMn_lSiO_4$ (k+l≤1, 0<k<1, and 0<l<1), $Li_{(2-j)}Fe_mNi_nCo_qSiO_4$, $Li_{(2-j)}Fe_mNi_nMn_qSiO_4$, $Li_{(2-j)}$ $Ni_mCo_nMn_qSiO_4$ ($m+n+q \le 1$, $0<m<1$, $0<n<1$, and $0<q<1$), and $Li_{(2-j)}Fe_rNi_sCo_tMn_uSiO_4$ ($r+s+t+u \le 1$, $0<r<1$, $0<s<1$, $0<t<1$, and $0<u<1$).

Still alternatively, a nasicon compound expressed by $A_xM_2(XO_4)_3$ (general formula) (A=Li, Na, or Mg, M=Fe, Mn, Ti, V, Nb, or Al, X=S, P, Mo, W, As, or Si) can be used for the positive electrode active material. Examples of the nasicon compound are $Fe_2(MnO_4)_3$, $Fe_2(SO_4)_3$, and $Li_3Fe_2(PO_4)_3$. Further alternatively, a compound expressed by $Li_2MPO_4F$, $Li_2MP_2O_7$, or $Li_5MO_4$ (general formula) (M=Fe or Mn), a perovskite fluoride such as $NaF_3$ and $FeF_3$, a metal chalcogenide (a sulfide, a selenide, or a telluride) such as $TiS_2$ and $MoS_2$, an oxide with an inverse spinel structure such as $LiMVO_4$, a vanadium oxide ($V_2O_5$, $V_6O_{13}$, $LiV_3O_8$, or the like), a manganese oxide, an organic sulfur compound, or the like can be used as the positive electrode active material.

In the case where carrier ions are alkali metal ions other than lithium ions, alkaline-earth metal ions, or aluminum ions, a material containing an alkali metal (e.g., sodium and potassium) or an alkaline-earth metal (e.g., calcium, strontium, barium, beryllium, and magnesium) instead of lithium may be used as the positive electrode active material.

As the separator 310, an insulator such as cellulose (paper), polyethylene, and polypropylene with pores can be used.

As an electrolyte of an electrolytic solution, a material which contains carrier ions is used. Typical examples of the electrolyte are lithium salts such as $LiPF_6$, $LiClO_4$, $LiAsF_6$, $LiBF_4$, $LiCF_3SO_3$, $Li(CF_3SO_2)_2N$, and $Li(C_2F_5SO_2)_2N$. One of these electrolytes may be used alone, or two or more of them may be used in an appropriate combination and in an appropriate ratio.

Note that when carrier ions are alkali metal ions other than lithium ions, or alkaline-earth metal ions, instead of lithium in the above lithium salts, an alkali metal (e.g., sodium and potassium), an alkaline-earth metal (e.g., calcium, strontium, barium, beryllium, and magnesium) may be used for the electrolyte.

As a solvent of the electrolytic solution, a material with the carrier ion mobility is used. As the solvent of the electrolytic solution, an aprotic organic solvent is preferably used. Typical examples of aprotic organic solvents include ethylene carbonate (EC), propylene carbonate, dimethyl carbonate, diethyl carbonate (DEC), γ-butyrolactone, acetonitrile, dimethoxyethane, tetrahydrofuran, and the like, and one or more of these materials can be used. When a gelled high-molecular material is used as the solvent of the electrolytic solution, safety against liquid leakage and the like is improved. Furthermore, the storage battery can be thinner and more lightweight. Typical examples of gelled high-molecular materials include a silicone gel, an acrylic gel, an acrylonitrile gel, polyethylene oxide, polypropylene oxide, a fluorine-based polymer, and the like. Alternatively, the use of one or more kinds of ionic liquids (room temperature molten salts) which have features of non-flammability and non-volatility as a solvent of the electrolytic solution can prevent the storage battery from exploding or catching fire even when the storage battery internally shorts out or the internal temperature increases owing to overcharging and others. An ionic liquid is a salt in the liquid state and has high ion mobility (conductivity). An ionic liquid contains a cation and an anion. Examples of ionic liquids include an ionic liquid containing an ethylmethylimidazolium (EMI) cation and an ionic liquid containing an N-methyl-N-propylpiperidinium ($PP_{13}$) cation.

Instead of the electrolytic solution, a solid electrolyte including an inorganic material such as a sulfide-based inorganic material or an oxide-based inorganic material, or a solid electrolyte including a macromolecular material such as a polyethylene oxide (PEO)-based macromolecular material may alternatively be used. When the solid electrolyte is used, a separator and a spacer are not necessary. Furthermore, the battery can be entirely solidified; therefore, there is no possibility of liquid leakage and thus the safety of the battery is dramatically increased.

For the positive electrode can 301 and the negative electrode can 302, a metal having a corrosion-resistant property to an electrolytic solution, such as nickel, aluminum, or titanium, an alloy of such a metal, or an alloy of such a metal and another metal (e.g., stainless steel or the like) can be used. Alternatively, the positive electrode can 301 and the negative electrode can 302 are preferably covered with nickel, aluminum, or the like in order to prevent corrosion due to the electrolytic solution. The positive electrode can 301 and the negative electrode can 302 are electrically connected to the positive electrode 304 and the negative electrode 307, respectively. When an exterior body containing a resin material is used instead of the positive electrode can 301 made of a metal or the negative electrode can 302 made of a metal, the coin-type storage battery 300 can have flexibility. Note that in the case where the exterior body containing a resin material is used, a conductive material is used for a portion connected to the outside.

The negative electrode 307, the positive electrode 304, and the separator 310 are immersed in the electrolytic solution. Then, as illustrated in FIG. 7B, the positive electrode 304, the separator 310, the negative electrode 307, and the negative electrode can 302 are stacked in this order with the positive electrode can 301 positioned at the bottom, and the positive electrode can 301 and the negative electrode can 302 are subjected to pressure bonding with the gasket 303 interposed therebetween. In such a manner, the coin-type storage battery 300 can be manufactured.

Here, a current flow in charging a battery will be described with reference to FIG. 7C. When a battery using lithium is regarded as a closed circuit, lithium ions transfer and a current flows in the same direction. Note that in the battery using lithium, an anode and a cathode change places in charge and discharge, and an oxidation reaction and a reduction reaction occur on the corresponding sides; hence, an electrode with a high redox potential is called a positive electrode and an electrode with a low redox potential is called a negative electrode. For this reason, in this specification, the positive electrode is referred to as a "positive electrode" and the negative electrode is referred to as a "negative electrode" in all the cases where charge is performed, discharge is performed, a reverse pulse current is supplied, and a charging current is supplied. The use of the terms "anode" and "cathode" related to an oxidation reaction and a reduction reaction might cause confusion because the anode and the cathode change places at the time of charging and discharging. Thus, the terms "anode" and "cathode" are not used in this specification. If the term "anode" or "cathode" is used, it should be mentioned that the anode or the cathode is which of the one at the time of charging or the one at the time of discharging and corresponds to which of a positive electrode or a negative electrode.

Figure 7C:
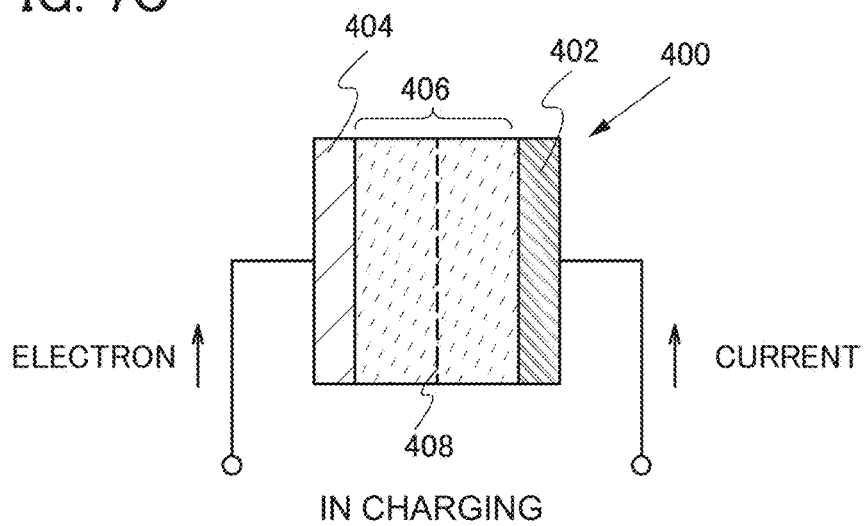

The storage battery 400 illustrated in FIG. 7C includes a positive electrode 402, a negative electrode 404, an electrolytic solution 406, and a separator 408. Two terminals in FIG. 7C are connected to a charger, and a storage battery 400 is charged. As the charge of the storage battery 400 proceeds, a potential difference between electrodes increases. The positive direction in FIG. 7C is the direction in which a current flows from one terminal outside the storage battery 400 to a positive electrode 402, flows from the positive electrode 402 to a negative electrode 404 in the storage battery 400, and flows from the negative electrode 404 to the other terminal outside the storage battery 400. In other words, a current flows in the direction of a flow of a charging current.

[Cylindrical Storage Battery]

Figure 8A:
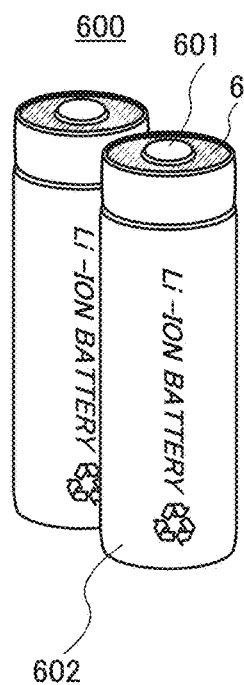
FIGS. 8A and 8B illustrate a cylindrical secondary battery of an embodiment.

Next, an example of a cylindrical storage battery will be described with reference to FIGS. 8A and 8B. As illustrated in FIG. 8A, a cylindrical storage battery 600 includes a positive electrode cap (battery cap) 601 on the top surface and a battery can (outer can) 602 on the side surface and bottom surface. The positive electrode cap 601 and the battery can 602 are insulated from each other by a gasket (insulating gasket) 610.

Figure 8B:
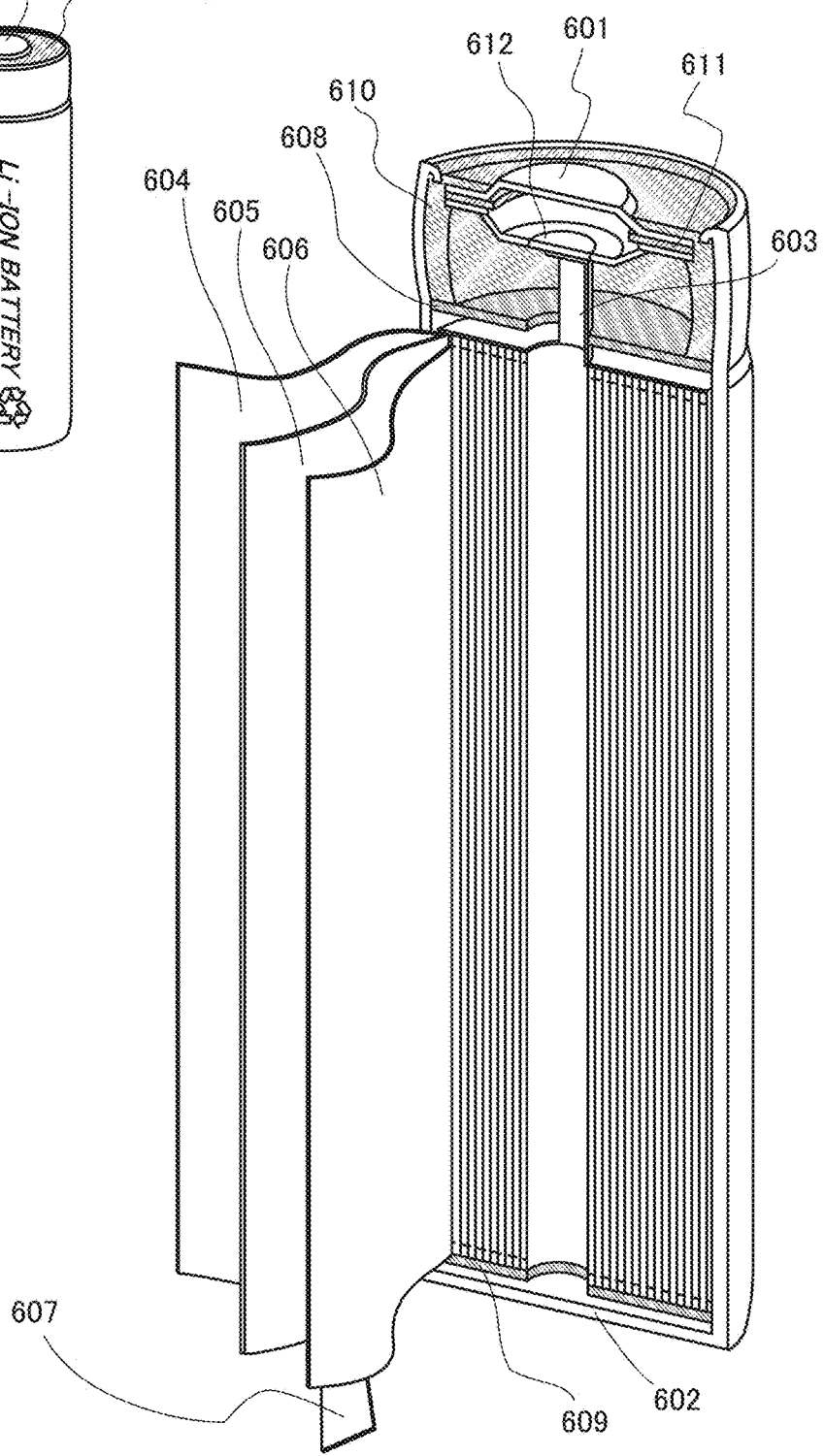

FIG. 8B is a diagram schematically illustrating a cross section of the cylindrical storage battery. Inside the battery can 602 having a hollow cylindrical shape, a battery element in which a strip-like positive electrode 604 and a strip-like negative electrode 606 are wound with a stripe-like separator 605 interposed therebetween is provided. Although not illustrated, the battery element is wound around a center pin. One end of the battery can 602 is close and the other end thereof is open. For the battery can 602, a metal having a corrosion-resistant property to an electrolytic solution, such as nickel, aluminum, or titanium, an alloy of such a metal, or an alloy of such a metal and another metal (e.g., stainless steel or the like) can be used. Alternatively, the battery can 602 is preferably covered with nickel, aluminum, or the like in order to prevent corrosion due to the electrolytic solution. Inside the battery can 602, the battery element in which the positive electrode, the negative electrode, and the separator are wound is provided between a pair of insulating plates 608 and 609 which face each other. Furthermore, a nonaqueous electrolytic solution (not illustrated) is injected inside the battery can 602 provided with the battery element. As the nonaqueous electrolytic solution, a nonaqueous electrolytic solution that is similar to those of the coin-type storage battery can be used. Note that when an exterior body containing a resin material is used instead of the battery can 602 made of a metal, a flexible cylindrical storage battery can be fabricated. Note that in the case where the exterior body containing a resin material is used, a conductive material is used for a portion connected to the outside.

Although the positive electrode 604 and the negative electrode 606 can be formed in a manner similar to that of the positive electrode and the negative electrode of the coin-type storage battery described above, the difference lies in that, since the positive electrode and the negative electrode of the cylindrical storage battery are wound, active materials are formed on both sides of the current collectors. A positive electrode terminal (positive electrode current collecting lead) 603 is connected to the positive electrode 604, and a negative electrode terminal (negative electrode current collecting lead) 607 is connected to the negative electrode 606. Both the positive electrode terminal 603 and the negative electrode terminal 607 can be formed using a metal material such as aluminum. The positive electrode terminal 603 and the negative electrode terminal 607 are resistance-welded to a safety valve mechanism 612 and the bottom of the battery can 602, respectively. The safety valve mechanism 612 is electrically connected to the positive electrode cap 601 through a positive temperature coefficient (PTC) element 611. The safety valve mechanism 612 cuts off electrical connection between the positive electrode cap 601 and the positive electrode 604 when the internal pressure of the battery exceeds a predetermined threshold value. The PTC element 611, which serves as a thermally sensitive resistor whose resistance increases as temperature rises, limits the amount of current by increasing the resistance, in order to prevent abnormal heat generation. Note that barium titanate ($BaTiO_3$)-based semiconductor ceramic can be used for the PTC element.

[Thin Storage Battery]

Next, an example of a thin storage battery will be described with reference to FIG. 9A. When a flexible thin storage battery is used in an electronic device at least part of which is flexible, the storage battery can be bent as the electronic device is bent.

Figure 9A:
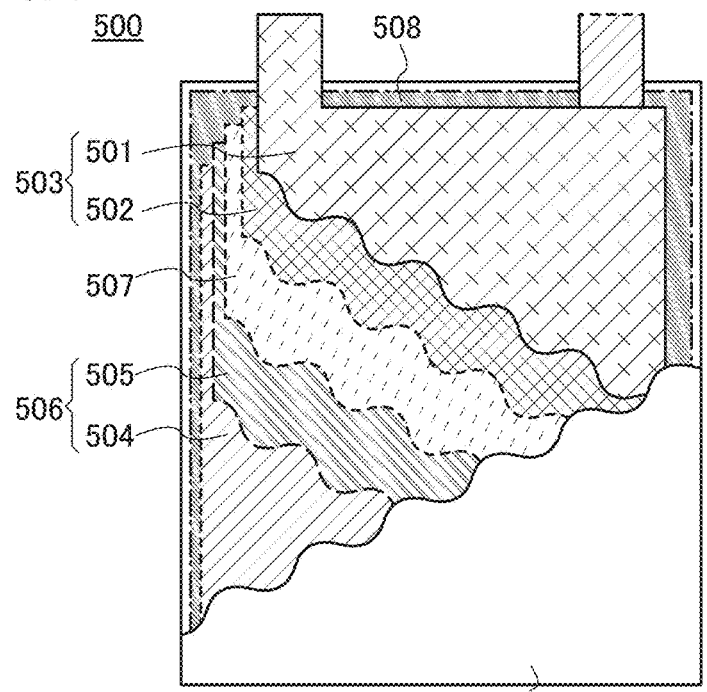
FIGS. 9A and 9B illustrate a thin secondary battery of an embodiment.

A thin storage battery 500 illustrated in FIG. 9A includes a positive electrode 503 including a positive electrode current collector 501 and a positive electrode active material layer 502, a negative electrode 506 including a negative electrode current collector 504 and a negative electrode active material layer 505, a separator 507, an electrolytic solution 508, and an exterior body 509. The separator 507 is provided between the positive electrode 503 and the negative electrode 506 in the exterior body 509. The electrolytic solution 508 is included in the exterior body 509.

In the thin storage battery 500 illustrated in FIG. 9A, the positive electrode current collector 501 and the negative electrode current collector 504 also serve as terminals for an electrical contact with an external portion. For this reason, each of the positive electrode current collector 501 and the negative electrode current collector 504 is arranged so that part of the positive electrode current collector 501 and part of the negative electrode current collector 504 are exposed to the outside the exterior body 509. Alternatively, a lead electrode and the positive electrode current collector 501 or the negative electrode current collector 504 may be bonded to each other by ultrasonic welding, and instead of the positive electrode current collector 501 and the negative electrode current collector 504, part of the lead electrode may be exposed to the outside the exterior body 509.

As the exterior body 509 in the thin storage battery 500, for example, a film having a three-layer structure in which a highly flexible metal thin film of aluminum, stainless steel, copper, nickel, or the like is provided over a film formed of a material such as polyethylene, polypropylene, polycarbonate, ionomer, or polyamide, and an insulating synthetic resin film of a polyamide-based resin, a polyester-based resin, or the like is provided as the outer surface of the exterior body over the metal thin film can be used. For example, a film including a resin film and a metal film can be used. The film including at least a resin film and a metal thin film is lightweight and has an excellent barrier property against moisture and an excellent heat dissipation property; thus, the laminate film is suitable for a storage battery in a portable electronic device.

Figure 9B:
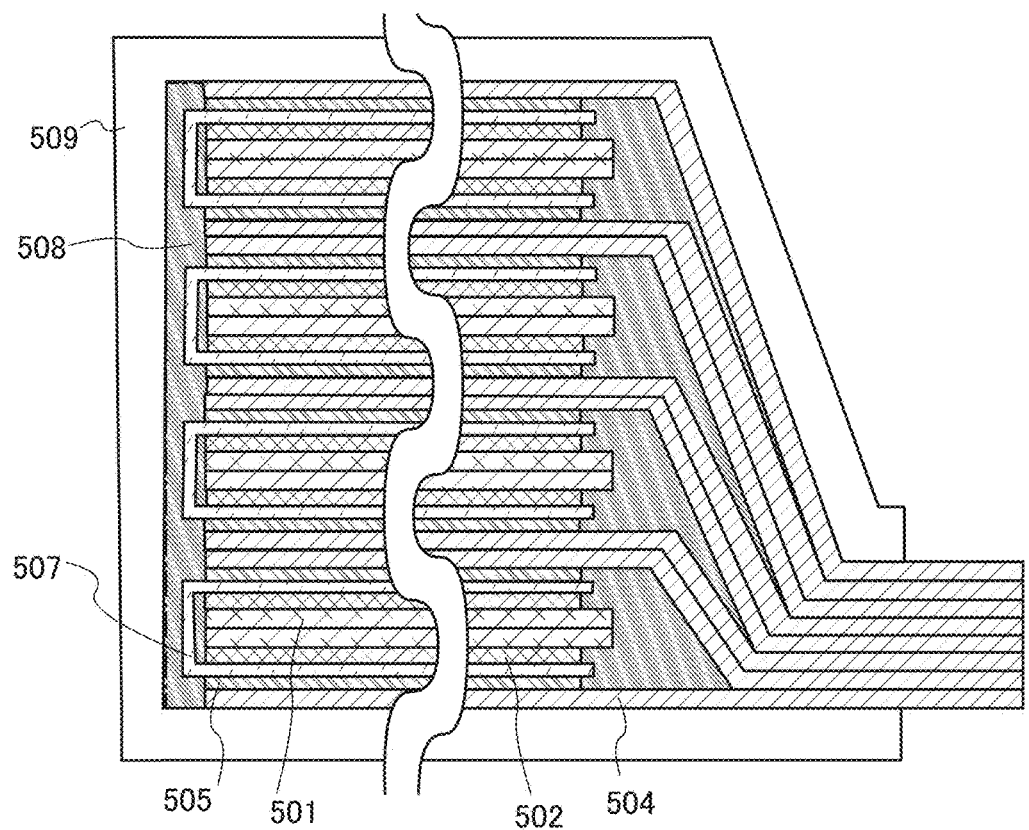

FIG. 9B illustrates an example of a cross-sectional structure of the thin storage battery 500. FIG. 9A illustrates an example of including only two current collectors, that is, a pair of electrode layers, for simplicity, and the actual battery includes three or more electrode layers.

The example in FIG. 9B includes 16 electrode layers. The thin storage battery 500 has flexibility even though including 16 electrode layers. In FIG. 9B, eight negative electrode current collectors 504 and eight positive electrode current collectors 501 are included. Note that FIG. 9B illustrates a cross section of the lead portion of the negative electrode, and 8 negative electrode current collectors 504 are bonded to each other by ultrasonic welding. For example, with an ultrasonic welder, a plurality of electrode layers are subjected to ultrasonic welding so as to be electrically connected to one another. The method of electrically connecting the current collectors is not limited to ultrasonic welding, and bolting may be employed. It is needless to say that the number of electrode layers is not limited to 16, and may be more than 16 or less than 16. In the case of using a large number of electrode layers, the storage battery can have high capacity. In contrast, in the case of using a small number of electrode layers, the storage battery can have a small thickness and high flexibility.

Figure 10A:
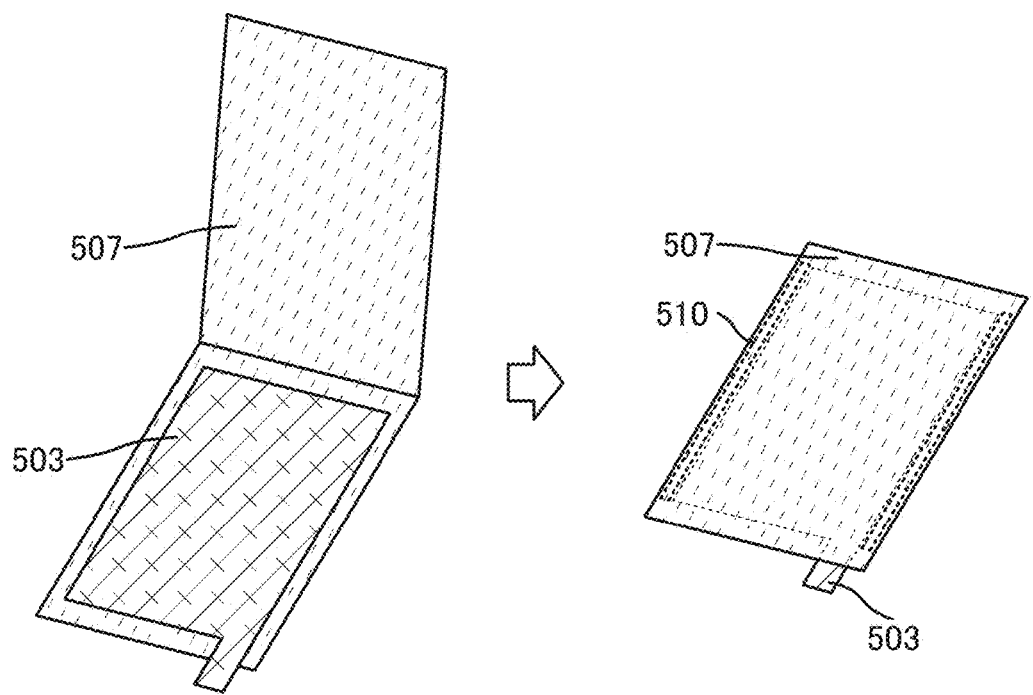
FIGS. 10A and 10B illustrate a thin secondary battery of an embodiment.
Figure 10B:
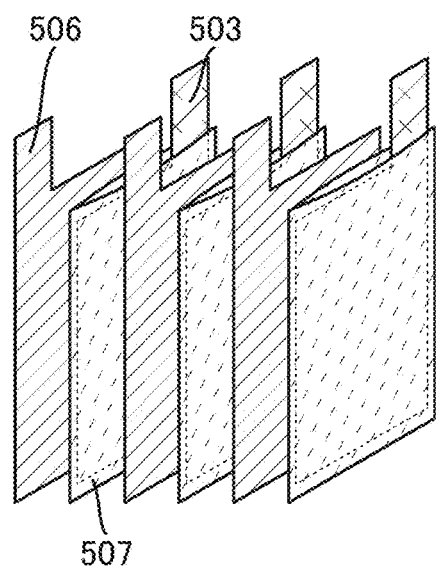

The separator 507 is preferably formed to have a bag-like shape to surround one of the positive electrode 503 and the negative electrode 506. For example, as illustrated in FIG. 10A, the separator 507 is folded in two so that the positive electrode 503 is sandwiched, and sealed with a sealing member 510 in a region outside the region overlapping with the positive electrode 503; thus, the positive electrode 503 can be reliably supported inside the separator 507. Then, as illustrated in FIG. 10B, the positive electrodes 503 surrounded by the separators 507 and the negative electrodes 506 are alternately stacked and provided in the exterior body 509, whereby the thin storage battery 500 can be formed.

Note that in this embodiment, the coin-type storage battery, the thin storage battery, and the cylindrical storage battery are given as examples of the storage battery; however, any of storage batteries with a variety of shapes, such as a sealed storage battery and a square-type storage battery, can be used. Furthermore, a structure in which a plurality of positive electrodes, a plurality of negative electrodes, and a plurality of separators are stacked or wound may be employed.

For each of the negative electrodes of the storage batteries 300, 500, and 600, which are described in this embodiment, the negative electrode active material layer of one embodiment of the present invention can be used. Thus, the discharge capacity of the storage batteries 300, 500, and 600 can be increased.

Figure 11A:
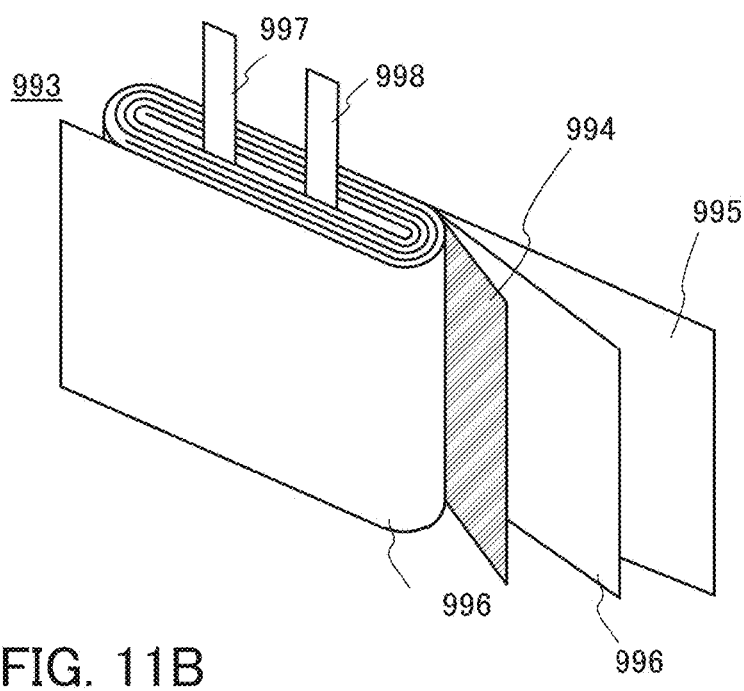
FIGS. 11A to 11C illustrate a thin secondary battery of an embodiment.
Figure 11B:
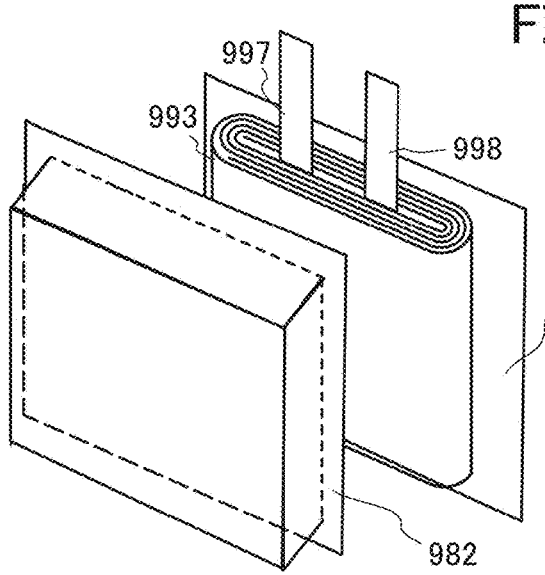
Figure 11C:
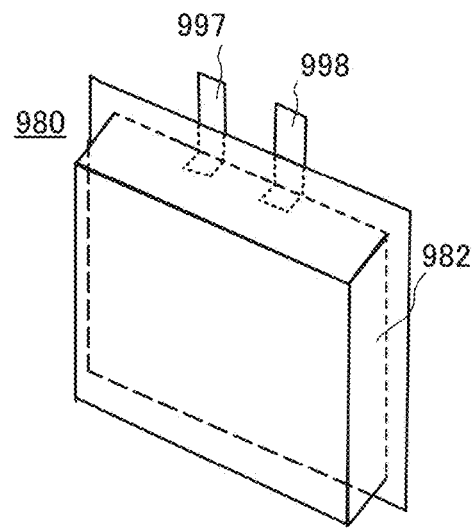

The thin storage battery is not limited to that illustrated in FIGS. 9A and 9B, and other examples of thin storage batteries are illustrated in FIGS. 11A to 11C. A wound body 993 illustrated in FIG. 11A includes a negative electrode 994, a positive electrode 995, and a separator 996.

The wound body 993 is obtained by winding a sheet of a stack in which the negative electrode 994 overlaps with the positive electrode 995 with the separator 996 therebetween. The wound body 993 is covered with a rectangular sealed container or the like; thus, a rectangular secondary battery is fabricated.

Note that the number of stacks each including the negative electrode 994, the positive electrode 995, and the separator 996 is determined as appropriate depending on capacity and element volume which are required. The negative electrode 994 is connected to a negative electrode current collector (not illustrated) via one of a lead electrode 997 and a lead electrode 998. The positive electrode 995 is connected to a positive electrode current collector (not illustrated) via the other of the lead electrode 997 and the lead electrode 998.

As illustrated in FIGS. 11B and 11C, in a power storage device 980, the wound body 993 is packed in a space formed by bonding a film 981 and a film 982 having a depressed portion by thermocompression bonding or the like. The wound body 993 includes the lead electrode 997 and the lead electrode 998, and is soaked in an electrolytic solution inside a space surrounded by the film 981 and the film 982 having a depressed portion.

For the film 981 and the film 982 having a depressed portion, a metal material such as aluminum or a resin material can be used, for example. With the use of a resin material for the film 981 and the film 982 having a depressed portion, the film 981 and the film 982 having a depressed portion can be changed in their forms when external force is applied; thus, a flexible storage battery can be fabricated. In the case where the film 981 and the film 982 having a depressed portion are changed in their forms when external force is applied, high adhesion between the current collector and the active material layer in contact with the current collector can be maintained by alloying part of the current collector.

Although FIGS. 11B and 11C illustrate an example where a space is formed by two films, the wound body 993 may be placed in a space formed by bending one film.

Furthermore, a flexible power storage device in which not only does a thin storage battery have flexibility but also an exterior body and a sealed container have flexibility can be fabricated when a resin material or the like is used for the exterior body and the sealed container. Note that in the case where a resin material is used for the exterior body and the sealed container, a conductive material is used for a portion connected to the outside.

For example, FIGS. 12A to 12C illustrate an example of a flexible rectangular storage battery. The wound body 993 illustrated in FIG. 12A is the same as that illustrated in FIG. 11A, and a detailed description thereof is omitted.

As illustrated in FIGS. 12B and 12C, in a power storage device 990, the wound body 993 is packed in an exterior body 991. The wound body 993 includes the lead electrode 997 and the lead electrode 998, and is soaked in an electrolytic solution inside a space surrounded by the exterior body 991 and an exterior body 992. For example, a metal material such as aluminum or a resin material can be used for the exterior bodies 991 and 992. With the use of a resin material for the exterior bodies 991 and 992, the exterior bodies 991 and 992 can be changed in their forms when external force is applied; thus, a flexible rectangular storage battery can be fabricated. In the case where the exterior bodies 991 and 992 are changed in their forms when external force is applied, high adhesion between the current collector and the active material layer in contact with the current collector can be maintained by alloying part of the current collector.

Structural examples of power storage devices (power storage units) will be described with reference to FIGS. 13A and 13B, FIGS. 14A1, 14A2, 14B1, and 14B2, and FIGS. 15A and 15B.

Figure 13A:
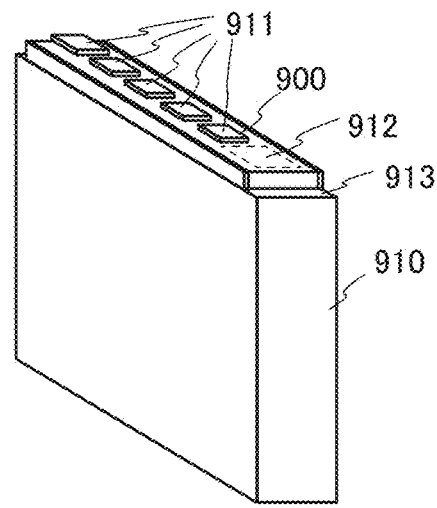
FIGS. 13A and 13B illustrate a power storage devices of an embodiment.
Figure 13B:
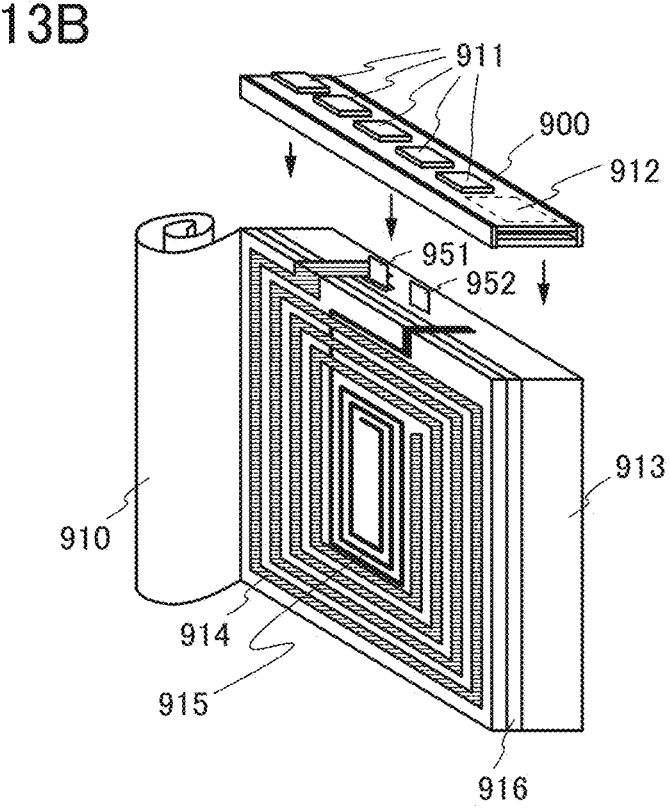

FIGS. 13A and 13B are external views of a power storage device. The power storage device includes a circuit board 900 and a power storage unit 913. A label 910 is attached to the power storage unit 913. As shown in FIG. 13B, the power storage device further includes a terminal 951 and a terminal 952, and includes an antenna 914 and an antenna 915 between the power storage unit 913 and the label 910.

The circuit board 900 includes terminals 911 and a circuit 912. The terminals 911 are connected to the terminals 951 and 952, the antennas 914 and 915, and the circuit 912. Note that a plurality of terminals 911 serving as a control signal input terminal, a power supply terminal, and the like may be provided.

The circuit 912 may be provided on the rear surface of the circuit board 900. The shape of each of the antennas 914 and 915 is not limited to a coil shape and may be a linear shape or a plate shape. Further, a planar antenna, an aperture antenna, a traveling-wave antenna, an EH antenna, a magnetic-field antenna, or a dielectric antenna may be used. Alternatively, the antenna 914 or the antenna 915 may be a flat-plate conductor. The flat-plate conductor can serve as one of conductors for electric field coupling. That is, the antenna 914 or the antenna 915 can serve as one of two conductors of a capacitor. Thus, electric power can be transmitted and received not only by an electromagnetic field or a magnetic field but also by an electric field.

The line width of the antenna 914 is preferably larger than that of the antenna 915. This makes it possible to increase the amount of electric power received by the antenna 914.

The power storage device includes a layer 916 between the power storage unit 913 and the antennas 914 and 915. The layer 916 may have a function of preventing an adverse effect on an electromagnetic field by the power storage unit 913. As the layer 916, for example, a magnetic body can be used.

Note that the structure of the power storage device is not limited to that shown in FIGS. 13A and 13B.

For example, as shown in FIGS. 14A1 and 14A2, two opposite surfaces of the power storage unit 913 in FIGS. 13A and 13B may be provided with respective antennas. FIG. 14A1 is an external view showing one side of the opposite surfaces, and FIG. 14A2 is an external view showing the other side of the opposite surfaces. For portions similar to those in FIGS. 13A and 13B, a description of the power storage device illustrated in FIGS. 13A and 13B can be referred to as appropriate.

As illustrated in FIG. 14A1, the antenna 914 is provided on one of the opposite surfaces of the power storage unit 913 with the layer 916 interposed therebetween, and as illustrated in FIG. 14A2, the antenna 915 is provided on the other of the opposite surfaces of the power storage unit 913 with a layer 917 interposed therebetween. The layer 917 may have a function of preventing an adverse effect on an electromagnetic field by the power storage unit 913. As the layer 917, for example, a magnetic body can be used.

With the above structure, both of the antennas 914 and 915 can be increased in size.

Alternatively, as illustrated in FIGS. 14B1 and 14B2, two opposite surfaces of the power storage unit 913 in FIGS. 13A and 13B may be provided with different types of antennas. FIG. 14B1 is an external view showing one side of the opposite surfaces, and FIG. 14B2 is an external view showing the other side of the opposite surfaces. For portions similar to those in FIGS. 13A and 13B, a description of the power storage device illustrated in FIGS. 13A and 13B can be referred to as appropriate.

As illustrated in FIG. 14B1, the antenna 914 is provided on one of the opposite surfaces of the power storage unit 913 with the layer 916 interposed therebetween, and as illustrated in FIG. 14B2, an antenna 918 is provided on the other of the opposite surfaces of the power storage unit 913 with the layer 917 interposed therebetween. The antenna 918 has a function of communicating data with an external device, for example. An antenna with a shape that can be applied to the antennas 914 and 915, for example, can be used as the antenna 918. As a system for communication using the antenna 918 between the power storage device and the external device, a response method that can be used between the power storage device and the external device, such as NFC, can be employed.

Figure 15A:
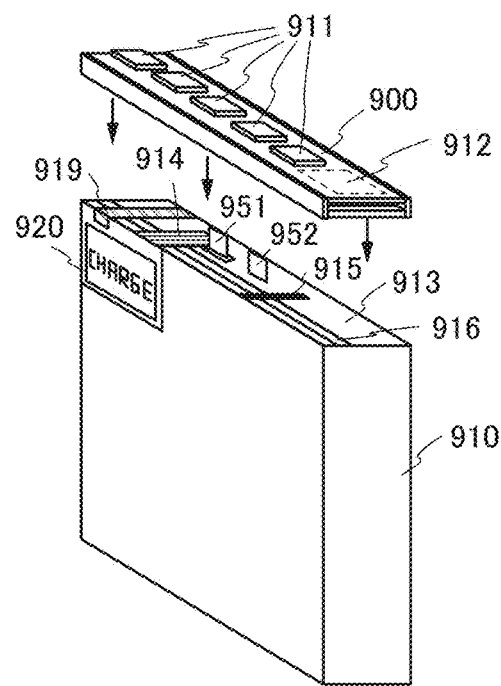
FIGS. 15A and 15B illustrate a power storage device of an embodiment.

Alternatively, as illustrated in FIG. 15A, the power storage unit 913 in FIGS. 13A and 13B may be provided with a display device 920. The display device 920 is electrically connected to the terminal 911 via a terminal 919. It is possible that the label 910 is not provided in a portion where the display device 920 is provided. For portions similar to those in FIGS. 13A and 13B, a description of the power storage device illustrated in FIGS. 13A and 13B can be referred to as appropriate.

The display device 920 can display, for example, an image showing whether charge is being carried out, an image showing the amount of stored power, or the like. As the display device 920, electronic paper, a liquid crystal display device, an electroluminescent (EL) display device, or the like can be used. For example, the use of electronic paper can reduce power consumption of the display device 920.

Figure 15B:
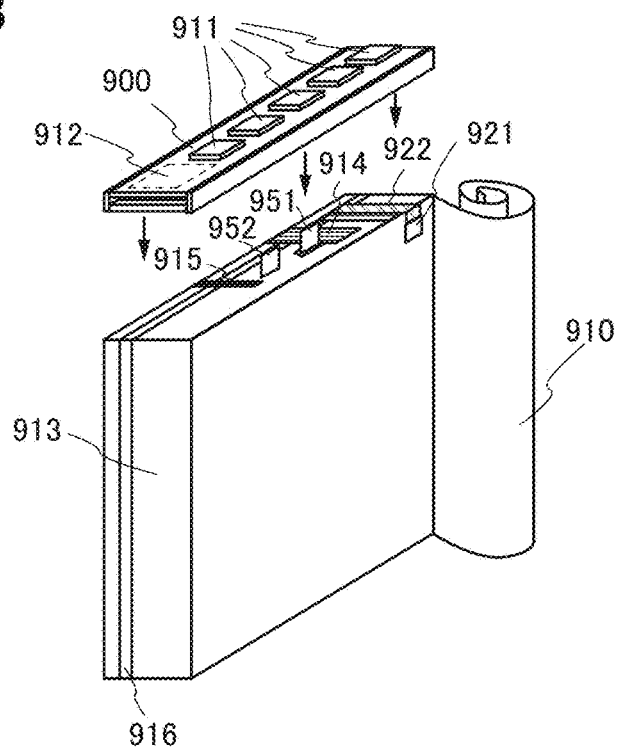

Alternatively, as illustrated in FIG. 15B, the power storage unit 913 illustrated in FIGS. 13A and 13B may be provided with a sensor 921. The sensor 921 is electrically connected to the terminal 911 via a terminal 922. Note that the sensor 921 may be provided between the power storage unit 913 and the label 910. For portions similar to those in FIGS. 13A and 13B, a description of the power storage device illustrated in FIGS. 13A and 13B can be referred to as appropriate.

As the sensor 921, a sensor that has a function of measuring, for example, force, displacement, position, speed, acceleration, angular velocity, rotational frequency, distance, light, liquid, magnetism, temperature, chemical substance, sound, time, hardness, electric field, electric current, voltage, electric power, radiation, flow rate, humidity, gradient, oscillation, odor, or infrared rays can be used. With the sensor 921, for example, data on an environment (e.g., temperature) where the power storage device is placed can be determined and stored in a memory inside the circuit 912.

FIGS. 16A to 16F illustrate examples of electronic devices including the flexible storage batteries described in FIGS. 9A and 9B, FIGS. 11A to 11C, and FIGS. 12A to 12C. Examples of electronic devices each including a flexible power storage device include television devices (also referred to as televisions or television receivers), monitors of computers or the like, cameras such as digital cameras and digital video cameras, digital photo frames, mobile phones (also referred to as mobile phones or mobile phone devices), portable game machines, portable information terminals, audio reproducing devices, and large game machines such as pachinko machines.

In addition, a flexible power storage device can be incorporated along a curved inside/outside wall surface of a house or a building or a curved interior/exterior surface of a car.

Figure 16A:
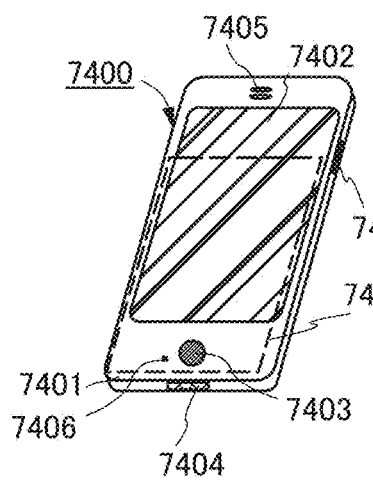
FIGS. 16A to 16F each illustrate an electronic device including a flexible secondary battery of an embodiment.

FIG. 16A illustrates an example of a mobile phone. A mobile phone 7400 is provided with a display portion 7402 incorporated in a housing 7401, an operation button 7403, an external connection port 7404, a speaker 7405, a microphone 7406, and the like. Note that the mobile phone 7400 includes a power storage device 7407.

Figure 16B:
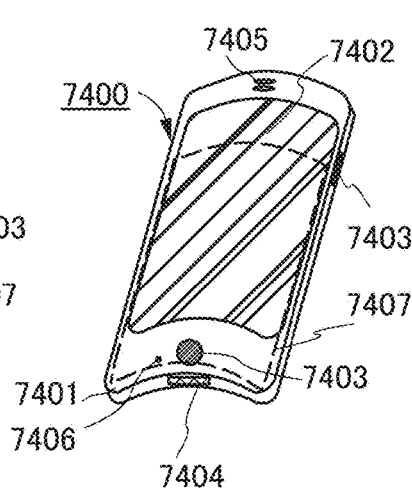
Figure 16C:
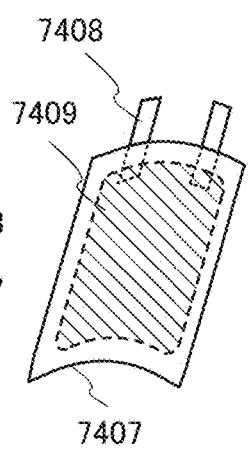

FIG. 16B illustrates the mobile phone 7400 that is bent. When the whole mobile phone 7400 is bent by the external force, the power storage device 7407 included in the mobile phone 7400 is also bent. FIG. 16C illustrates the bent power storage device 7407. The power storage device 7407 is a thin storage battery. The power storage device 7407 is fixed in a state of being bent. Note that the power storage device 7407 includes a lead electrode 7408 electrically connected to a current collector 7409. The current collector 7409 is, for example, copper foil, and partly alloyed with gallium; thus, adhesion between the current collector 7409 and an active material layer in contact with the current collector 7409 is improved and the power storage device 7407 can have high reliability even in a state of being bent.

Figure 16D:
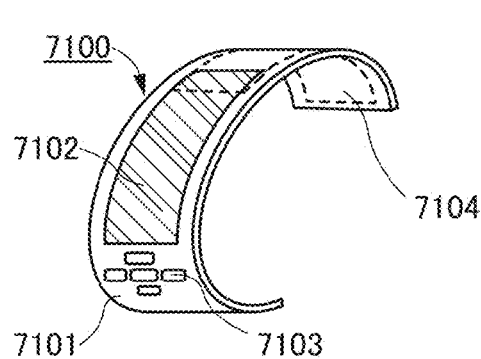
Figure 16E:
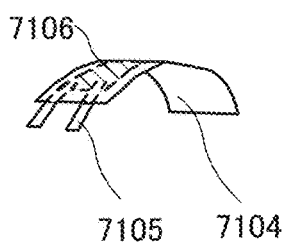

FIG. 16D illustrates an example of a bangle display device. A portable display device 7100 includes a housing 7101, a display portion 7102, an operation button 7103, and a power storage device 7104. FIG. 16E illustrates the bent power storage device 7104. When the display device is worn on a user's arm while the power storage device 7104 is bent, the housing changes its form and the curvature of a part or the whole of the power storage device 7104 is changed. Note that the radius of curvature of a curve at a point refers to the radius of the circular arc that best approximates the curve at that point. The reciprocal of the radius of curvature is curvature. Specifically, a part or the whole of the housing or the main surface of the power storage device 7104 is changed in the range of radius of curvature R from 40 mm to 150 mm. When the radius of curvature R at the main surface of the power storage device 7104 is greater than or equal to 40 mm and less than or equal to 150 mm, the reliability can be kept high. Note that the power storage device 7104 includes a lead electrode 7105 that is electrically connected to a current collector 7106. The current collector 7106 is, for example, a copper foil, and partly alloyed with gallium; thus, adhesion between the current collector 7106 and an active material layer in contact with the current collector 7106 is improved and the power storage device 7104 can have high reliability even when the power storage device 7104 is bent and its curvature is changed many times.

Figure 16F:
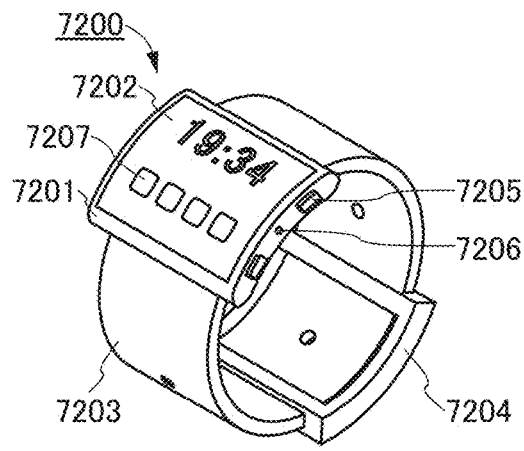

FIG. 16F illustrates an example of a watch-type portable information terminal. A portable information terminal 7200 includes a housing 7201, a display portion 7202, a band 7203, a buckle 7204, an operation button 7205, an input output terminal 7206, and the like.

The portable information terminal 7200 is capable of executing a variety of applications such as mobile phone calls, e-mailing, viewing and editing texts, music reproduction, Internet communication, and a computer game.

The display surface of the display portion 7202 is curved, and images can be displayed on the curved display surface. In addition, the display portion 7202 includes a touch sensor, and operation can be performed by touching the screen with a finger, a stylus, or the like. For example, by touching an icon 7207 displayed on the display portion 7202, application can be started.

With the operation button 7205, a variety of functions such as power on/off, on/off of wireless communication, setting and cancellation of a manner mode, and setting and cancellation of a power saving mode can be performed. For example, the functions of the operation button 7205 can be set freely by setting the operation system incorporated in the portable information terminal 7200.

The portable information terminal 7200 can employ near field communication that is a communication method based on an existing communication standard. In that case, for example, mutual communication between the portable information terminal 7200 and a headset capable of wireless communication can be performed, and thus hands-free calling is possible.

Moreover, the portable information terminal 7200 includes the input output terminal 7206, and data can be directly transmitted to and received from another information terminal via a connector. In addition, charging via the input output terminal 7206 is possible. Note that the charging operation may be performed by wireless power feeding without using the input output terminal 7206.

The display portion 7202 of the portable information terminal 7200 is provided with a power storage device including the electrode member of one embodiment of the present invention. For example, the power storage device 7104 illustrated in FIG. 16E that is in the state of being curved can be provided in the housing 7201. Alternatively, the power storage device 7104 illustrated in FIG. 16E can be provided in the band 7203 such that it can be curved.

The use of storage batteries in vehicles enables production of next-generation clean energy vehicles such as hybrid electric vehicles (HEVs), electric vehicles (EVs), and plug-in hybrid electric vehicles (PHEVs).

Figure 17A:
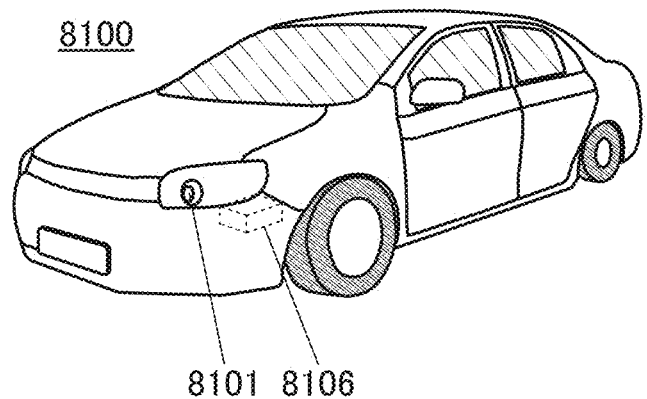
FIGS. 17A and 17B each illustrate a vehicle including a secondary battery of an embodiment.
Figure 17B:
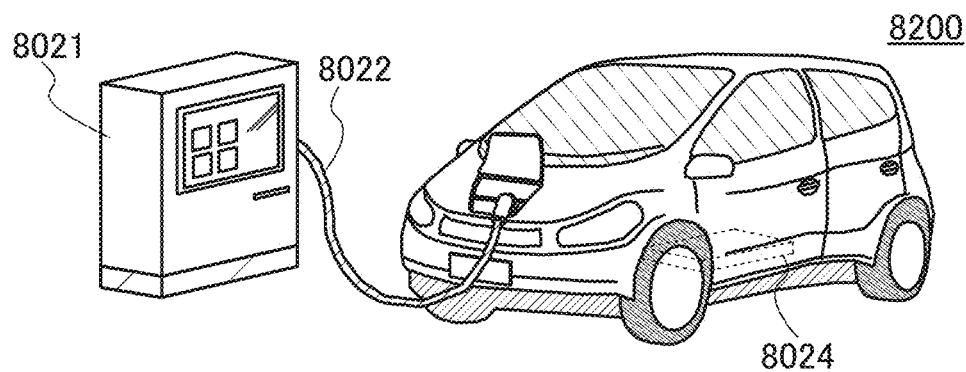

FIGS. 17A and 17B each illustrate an example of a vehicle using one embodiment of the present invention. An automobile 8100 illustrated in FIG. 17A is an electric vehicle that runs on the power of an electric motor 8106. Alternatively, the automobile 8100 is a hybrid electric vehicle capable of driving appropriately using either the electric motor 8106 or the engine. One embodiment of the present invention can provide a high-mileage vehicle. The automobile 8100 includes the power storage device. The power storage device is used not only for driving the electric motor 8106, but also for supplying electric power to a light-emitting device such as a headlight 8101 or a room light (not illustrated).

The power storage device can also supply electric power to a display device of a speedometer, a tachometer, or the like included in the automobile 8100. Furthermore, the power storage device can supply electric power to a semiconductor device included in the automobile 8100, such as a navigation system.

FIG. 17B illustrates an automobile 8200 including the power storage device. The automobile 8200 can be charged when the power storage device is supplied with electric power through external charging equipment by a plug-in system, a contactless power feeding system, or the like. In FIG. 17B, the power storage device included in the automobile 8200 is charged with the use of a ground-based charging apparatus 8021 through a cable 8022. In charging, a given method such as CHAdeMO (registered trademark) or Combined Charging System may be employed as a charging method, the standard of a connector, or the like as appropriate. The charging apparatus 8021 may be a charging station provided in a commerce facility or a power source in a house. For example, with the use of a plug-in technique, the power storage device 8024 included in the automobile 8200 can be charged by being supplied with electric power from outside. The charging can be performed by converting AC electric power into DC electric power through a converter such as an AC-DC converter.

Furthermore, although not illustrated, the vehicle may include a power receiving device so that it can be charged by being supplied with electric power from an above-ground power transmitting device in a contactless manner. In the case of the contactless power feeding system, by fitting a power transmitting device in a road or an exterior wall, charging can be performed not only when the electric vehicle is stopped but also when driven. In addition, the contactless power feeding system may be utilized to perform transmission and reception of electric power between two vehicles. Furthermore, a solar cell may be provided in the exterior of the automobile to charge the power storage device when the automobile stops or moves. To supply electric power in such a contactless manner, an electromagnetic induction method or a magnetic resonance method can be used.

According to one embodiment of the present invention, the power storage device can have improved cycle characteristics and reliability. Furthermore, according to one embodiment of the present invention, the power storage device itself can be made more compact and lightweight as a result of improved characteristics of the power storage device. The compact and lightweight power storage device contributes to a reduction in the weight of a vehicle, and thus increases the driving distance. Furthermore, the power storage device included in the vehicle can be used as a power source for supplying electric power to products other than the vehicle. In such a case, the use of a commercial power source can be avoided at peak time of electric power demand.

At least part of this embodiment can be implemented in combination with any of the other embodiments described in this specification as appropriate.

Example

In this example, the electrode member of one embodiment of the present invention was formed and the cross section thereof was observed.

[Formation of Sample]

Powdery gallium and powdery lithium were weighed such that the molar ratio of gallium to lithium was 1:2. Then, propylene carbonate (PC) to be added to the mixture such that the concentration of $LiPF_6$ was 1M was prepared. After that, they were mixed in a mortar for 1 hour and then left for 24 hours. Subsequently, washing was performed using dimethyl carbonate (DMC) as a solvent to remove $LiPF_6$ and PC, and then, the washed mixture was held and dried at room temperature for 1 hour.

Then, VGCF and PVDF were mixed into the mixture such that the weight ratio of $Li_2Ga$:VGCF:PVDF was 90:5:5, and N-methylpyrrolidone (NMP) was added to the obtained mixture and they were mixed in a mortar for approximately 30 minutes to form slurry.

Subsequently, the slurry was applied to copper foil that serves as a current collector, and the current collector to which the slurry was applied was held and dried in a bell jar at 50° C. at reduced pressure for approximately 2 hours.

Note that the aforementioned steps were each performed in an inert gas (specifically, argon) atmosphere.

After that, the current collector to which the slurry was applied was soaked in propanol ($C_3H_8O$), and water ($H_2O$) was dripped little by little until the end of a reaction.

Subsequently, the current collector was held and dried at 25° C. for 2 hours and then held at 100° C. for 10 hours.

Through the above process, the electrode member was obtained.

[Observation of Cross Section]

The cross section of the formed electrode member was observed using a scanning electron microscope (SEM).

Figure 18A:
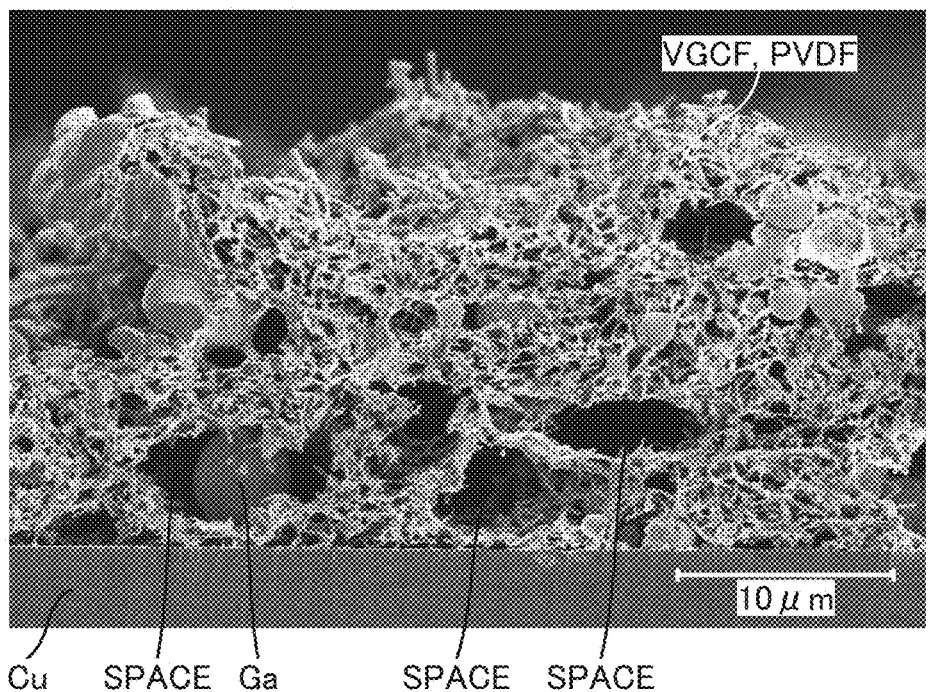
FIGS. 18A and 18B are cross-sectional observation images of an electrode member.
Figure 18B:
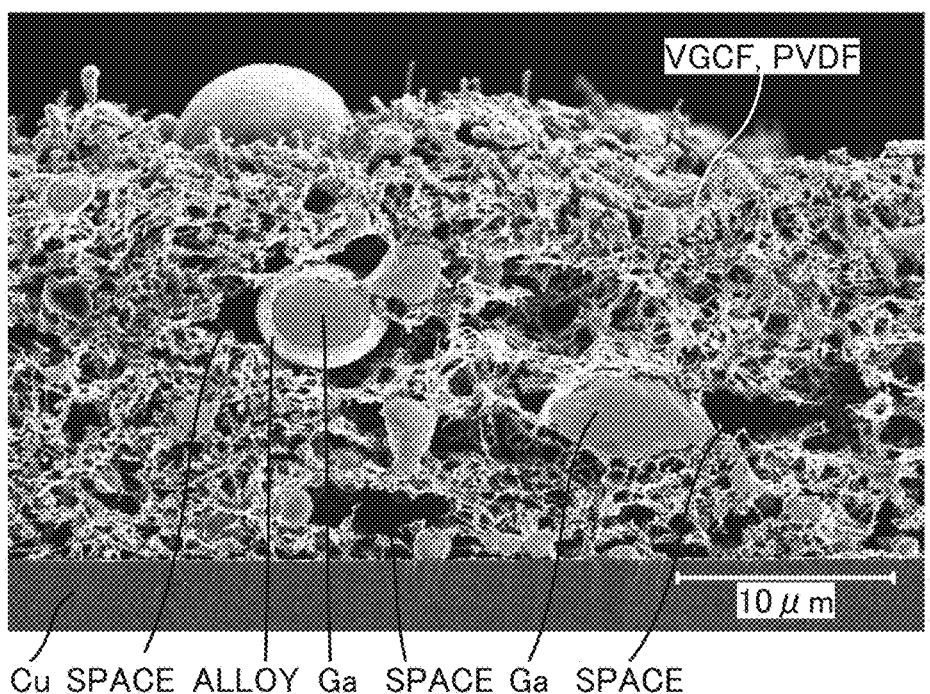

FIGS. 18A and 18B are micrographs showing observed cross sections of different regions of the electrode member.

It can be found from the micrograph of the cross section in FIG. 18A that VGCF is cross-linked by PVDF and a porous body including a number of pores is formed over copper (Cu) foil that serves as the current collector. It can also be found that many spaces larger than the pores are formed in the porous body and gallium (Ga) having a substantially spherical form is located in the space. Gallium is a material having an extremely low melting point and thus presumably has a spherical form easily because of its high surface tension.

The micrograph of the cross section of the region in FIG. 18B different from the region in FIG. 18A mainly shows two cross sections of gallium. Each gallium is located in the space in the porous body and in contact with part of the porous body. Note that it is observed in FIG. 18B that a surface of gallium on the left side is alloyed, and this is presumably an alloy of the gallium and copper contained in copper foil that serves as the current collector in processing of the sample for cross section observation.

According to the above results, gallium is located in contact with an inner wall of the space formed in the porous body in the electrode member formed in this example. In addition, the size of the space in the porous body is larger than that of gallium.

This application is based on Japanese Patent Application serial no. 2013-232118 filed with Japan Patent Office on Nov. 8, 2013, the entire contents of which are hereby incorporated by reference.

What is claimed is:

1. An electrode member comprising:
   a current collector;
   a porous body comprising conductive fibers on one surface of the current collector, the porous body including a plurality of pores and at least one space;
   an active material located in the space in the porous body; and
   a metal flake located in the porous body, the metal flake being in contact with the conductive fibers and the active material,
   wherein a size of the space is larger than or equal to a maximum size of the active material when including carrier ions at a maximum content value.

2. The electrode member according to claim 1, wherein the space is formed in the porous body by reducing a value of the active material.

3. The electrode member according to claim 1, wherein the active material comprises a metal whose melting point is lower than or equal to 250° C.

4. The electrode member according to claim 1, wherein the active material comprises a first alloy whose melting point is lower than or equal to 250° C.

5. The electrode member according to claim 1, wherein the active material comprises one of tin and gallium.

6. The electrode member according to claim 1, wherein the porous body further comprises resin.

7. The electrode member according to claim 1, wherein a second alloy is formed between the metal flake and the active material.

8. The electrode member according to claim 1, wherein the metal flake comprises copper.

9. A secondary battery comprising an electrode member, the electrode member comprising:
   a current collector;
   a porous body comprising conductive fibers on one surface of the current collector, the porous body including a plurality of pores and at least one space;
   an active material located in the space in the porous body; and
   a metal flake located in the porous body, the metal flake being in contact with the conductive fibers and the active material,
   wherein a size of the space is larger than a maximum size of the active material when including carrier ions at a maximum content value.

10. The secondary battery according to claim 9, wherein the space is formed in the porous body by reducing a value of the active material.

11. The secondary battery according to claim 9, wherein the active material comprises a metal whose melting point is lower than or equal to 250° C.

12. The secondary battery according to claim 9, wherein the active material comprises a first alloy whose melting point is lower than or equal to 250° C.

13. The secondary battery according to claim 9, wherein the active material comprises one of tin and gallium.

14. The secondary battery according to claim 9, wherein the porous body further comprises resin.

15. The secondary battery according to claim 9, wherein a second alloy is formed between the metal flake and the active material.

16. The secondary battery according to claim 9, wherein the metal flake comprises copper.

17. The electrode member according to claim 1, wherein the space is formed in the porous body by dissolving part of the active material.

18. The secondary battery according to claim 9, wherein the space is formed in the porous body by dissolving part of the active material.

19. The electrode member according to claim 1, wherein the size of the space is more than 2.42 times as large as a volume of the active material.

20. The secondary battery according to claim 9, wherein the size of the space is more than 2.42 times as large as a volume of the active material.

21. The electrode member according to claim 1, wherein the conductive fibers comprise vapor-grown carbon fiber.

22. The secondary battery according to claim 9, wherein the conductive fibers comprise vapor-grown carbon fiber.

23. The electrode member according to claim 6, wherein the resin comprises one of polyvinylidene fluoride, polyimide, polytetrafluoroethylene, polyvinyl chloride, ethylene-propylene-diene polymer, styrene-butadiene rubber, acrylonitrile-butadiene rubber, fluorine rubber, polyvinyl acetate, polymethyl methacrylate, polyethylene, and nitrocellulose.

24. The secondary battery according to claim 14, wherein the resin comprises one of polyvinylidene fluoride, polyimide, polytetrafluoroethylene, polyvinyl chloride, ethylene-propylene-diene polymer, styrene-butadiene rubber, acrylonitrile-butadiene rubber, fluorine rubber, polyvinyl acetate, polymethyl methacrylate, polyethylene, and nitrocellulose.

* * * * *